US010889346B2

(12) United States Patent
Kurokawa

(10) Patent No.: US 10,889,346 B2
(45) Date of Patent: Jan. 12, 2021

(54) ELECTRIC TWIST-GRIP OPERATING DEVICE

(71) Applicant: Shimano Inc., Osaka (JP)

(72) Inventor: Yuta Kurokawa, Osaka (JP)

(73) Assignee: Shimano Inc., Osaka (JP)

(*) Notice: Subject to any disclaimer, the term of this patent is extended or adjusted under 35 U.S.C. 154(b) by 259 days.

(21) Appl. No.: 15/680,651

(22) Filed: Aug. 18, 2017

(65) Prior Publication Data

US 2019/0054968 A1   Feb. 21, 2019

(51) Int. Cl.
| | |
|---|---|
| *B62J 1/08* | (2006.01) |
| *B62K 25/08* | (2006.01) |
| *B62M 9/132* | (2010.01) |
| *B62K 25/28* | (2006.01) |
| *B62M 9/122* | (2010.01) |
| *B62K 23/04* | (2006.01) |
| *B62K 25/04* | (2006.01) |
| *B62M 25/08* | (2006.01) |
| *F15B 11/10* | (2006.01) |
| *F15B 13/044* | (2006.01) |
| *B62M 25/00* | (2006.01) |

(52) U.S. Cl.
CPC ............... *B62J 1/08* (2013.01); *B62K 23/04* (2013.01); *B62K 25/04* (2013.01); *B62K 25/08* (2013.01); *B62K 25/28* (2013.01); *B62M 9/122* (2013.01); *B62M 9/132* (2013.01); *B62M 25/08* (2013.01); *F15B 11/10* (2013.01); *F15B 13/044* (2013.01); *B62J 2001/085* (2013.01); *B62K 2025/048* (2013.01); *B62M 2025/006* (2013.01)

(58) Field of Classification Search
CPC ....... B62J 1/08; B62J 2001/085; B62K 23/04; B62K 25/04; B62K 2025/048; B62M 25/08; F15B 13/044; F15B 11/10
USPC ........................................................ 280/288.4
See application file for complete search history.

(56) References Cited

U.S. PATENT DOCUMENTS

| | | | |
|---|---|---|---|
| 5,921,139 A | 7/1999 | Yamane | |
| 6,862,948 B1* | 3/2005 | Calendrille, Jr. ...... | B62K 23/06 74/489 |
| 7,083,180 B2 | 8/2006 | Turner | |
| 7,757,581 B2 | 7/2010 | Okamoto | |

(Continued)

FOREIGN PATENT DOCUMENTS

| | | | |
|---|---|---|---|
| DE | 10353761 A1 * | 6/2004 | ............... B62L 3/02 |
| DE | 10353761 A1 | 6/2004 | |

(Continued)

*Primary Examiner* — Jacob D Knutson
*Assistant Examiner* — Felicia L. Brittman
(74) *Attorney, Agent, or Firm* — Global IP Counselors, LLP

(57) ABSTRACT

An electric twist-grip operating device is basically provided with a base member and a switch unit. The base member is configured to be mounted around a bicycle handlebar. The switch unit is configured to output a first control signal to control a bicycle apparatus including at least one of a height adjustable seatpost and a suspension, the switch unit including a rotary operating member rotatable with respect to the base member about a longitudinal axis of the bicycle handlebar, the switch unit being configured to output one of the first control signal and a second control signal in response to a movement of the rotary operating member, the second control signal being different from the first control signal.

26 Claims, 15 Drawing Sheets

(56) References Cited

U.S. PATENT DOCUMENTS

| | | |
|---|---|---|
| 7,900,946 B2 | 3/2011 | Hara et al. |
| 8,091,910 B2 | 1/2012 | Hara et al. |
| 8,402,664 B1 | 3/2013 | Kitamura et al. |
| 8,429,061 B2 | 4/2013 | Shirai |
| 8,458,080 B2 | 6/2013 | Shirai |
| 8,550,551 B2 | 10/2013 | Shirai |
| 8,655,548 B2 | 2/2014 | Ichida et al. |
| 8,833,848 B2 | 9/2014 | Shirai |
| 9,157,523 B2 | 10/2015 | Miki et al. |
| 9,243,692 B2 | 1/2016 | Westing |
| 9,302,739 B2 | 4/2016 | Shirai |
| 9,422,018 B2 * | 8/2016 | Pelot ............... B62J 1/02 |
| 9,511,809 B2 | 12/2016 | Kodama et al. |
| 9,561,734 B2 | 2/2017 | Watarai et al. |
| 2009/0188340 A1 | 7/2009 | Tetsuka et al. |
| 2014/0298943 A1 * | 10/2014 | Hashimoto ......... B62K 23/04 74/473.12 |
| 2016/0280330 A1 | 9/2016 | Hara |

FOREIGN PATENT DOCUMENTS

| | | |
|---|---|---|
| DE | 20 2013 002 491 U1 | 7/2014 |
| DE | 10 2014 104 818 A1 | 10/2014 |
| WO | 2015-161389 A1 | 10/2015 |

\* cited by examiner

ELECTRIC TWIST-GRIP OPERATING DEVICE

BACKGROUND

Field of the Invention

This invention generally relates to an electric twist-grip operating device. More specifically, the present invention relates to an electric twist-grip operating device for operating a bicycle telescopic apparatus.

Background Information

Twist-grip control devices have been used with bicycles to operate transmission control elements in response to operation of a twist-grip operating member that rotates coaxially with a handlebar axis. An example of such a twist-grip deiee control dvic is disclosed in U.S. Pat. No. 7,757,581. The twist-grip control device disclosed in that patent includes a twist-grip operating member that rotates coaxially around a handlebar axis and a cable reel that rotates coaxially with the operating member for winding and unwinding a transmission control cable. The operating member rotates in clockwise and counterclockwise directions from a center position to operate a bicycle apparatus.

SUMMARY

Generally, the present disclosure is directed to various features of an electric twist-grip operating device. In one feature, an electric twist-grip operating device is provided having a rotary operating member and an additional operating member.

In view of the state of the known technology and in accordance with a first aspect of the present disclosure, an electric twist-grip operating device is provided that basically comprises a base member and a switch unit. The base member is configured to be mounted around a bicycle handlebar. The switch unit is configured to output a first control signal to control a bicycle apparatus including at least one of a height adjustable seatpost and a suspension. The switch unit includes a rotary operating member rotatable with respect to the base member about a longitudinal axis of the bicycle handlebar. The switch unit is configured to output one of the first control signal and a second control signal in response to a movement of the rotary operating member. The second control signal is different from the first control signal.

With the electric twist-grip operating device according to the first aspect, it is possible to use a twist-grip type operating device as an operating device of an electric telescopic apparatus.

In accordance with a second aspect of the present invention, the electric twist-grip operating device according to the first aspect is configured so that the rotary operating member is rotatable with respect to the base member about the longitudinal axis of the bicycle handlebar in at least one of a first direction and a second direction. The second direction is opposite to the first direction. The switch unit is configured to output the one of the first control signal and the second control signal in response to a rotation of the rotary operating member in the at least one of the first direction and the second direction. The second control signal is configured to operate a gear transmission.

With the electric twist-grip operating device according to the second aspect, it is possible to control one of an electric telescopic apparatus and a gear transmission by operating a rotary operating member.

In accordance with a third aspect of the present invention, the lectric twist-grip operating device according to the second aspect is configured so that the switch unit includes an additional operating member to output the other of the first control signal and the second control signal.

With the electric twist-grip operating device according to the third aspect, it is possible to distinguish operating members of an electric telescopic apparatus and a gear transmission.

In accordance with a fourth aspect of the present invention, the electric twist-grip operating device according to the third aspect is configured so that the additional operating member is movable with respect to the base member in a third direction that extends along a direction perpendicular to the longitudinal axis.

With the electric twist-grip operating device according to the fourth aspect, it is possible to easily operate an additional operating member by thumb.

In accordance with a fifth aspect of the present invention, the electric twist-grip operating device according to any one of the third and fourth aspects is configured so that the additional operating member is movable with respect to the base member in a fourth direction that extends along one of the first direction and the second direction.

With the electric twist-grip operating device according to the fifth aspect, it is possible to easily operate an additional operating member by thumb.

In accordance with a sixth aspect of the present invention, the electric twist-grip operating device according to any one of the third to fifth aspects is configured so that the additional operating member is movable with respect to the base member in a fifth direction that extends along the longitudinal axis.

With the electric twist-grip operating device according to the sixth aspect, it is possible to easily operate an additional operating member by thumb.

In accordance with a seventh aspect of the present invention, the electric twist-grip operating device according to any one of the third to sixth aspects is configured so that the switch unit is configured to concurrently output the first control signal and the second control signal upon operations of both of the rotary operating member and the additional operating member.

With the electric twist-grip operating device according to the seventh aspect, it is possible to concurrently operate a telescopic apparatus and a gear transmission by one twist-grip operating device.

In accordance with an eighth aspect of the present invention, the electric twist-grip operating device according to any one of the third to seventh aspects is configured so that the switch unit is configured to output the first control signal for a predetermined period per one operation applied to the additional operating member.

With the electric twist-grip operating device according to the eighth aspect, it is possible to control a height adjustable seatpost for a predetermined period.

In accordance with a ninth aspect of the present invention, the electric twist-grip operating device according to any one of the third to eighth aspects is configured so that the switch unit is configured to continuously or intermittently output the first control signal per one operation applied to the additional operating member.

With the electric twist-grip operating device according to the ninth aspect, it is possible to control a height adjustable seatpost during operating an electric twist-grip operating device.

In accordance with a tenth aspect of the present invention, the electric twist-grip operating device according to any one of the third to ninth aspects is configured so that the additional operating member is rotatable with respect to the base member together with the rotary operating member upon rotation of the rotary operating member.

With the electric twist-grip operating device according to the tenth aspect, it is possible to operate an additional operating member while operating a rotary operating member.

In accordance with an eleventh aspect of the present invention, the electric twist-grip operating device according to any one of the third to tenth aspects is configured so that the additional operating member is stationary with respect to the base member in a circumferential direction.

With the electric twist-grip operating device according to the eleventh aspect, it is possible to prevent an additional operating member being operated while the rotary operating member is rotated.

In accordance with a twelfth aspect of the present invention, the electric twist-grip operating device according to any one of the third to eleventh aspects is configured so that the additional operating member is at least partly closer to a bicycle center plane than the rotary operating member in a mounted state where the electric twist-grip operating device is mounted on the bicycle handlebar.

With the electric twist-grip operating device according to the twelfth aspect, it is possible to easily operate an additional operating member by thumb.

In accordance with a thirteenth aspect of the present invention, the electric twist-grip operating device according to any one of the third to twelfth aspects is configured so that the additional operating member is detachably attached to one of the base member and the rotary operating member.

With the electric twist-grip operating device according to the thirteenth aspect, it is possible to selectively attach and detach an additional operating member to and from an electric twist-grip operating device.

In accordance with a fourteenth aspect of the present invention, the electric twist-grip operating device according to any one of the second to thirteenth aspects is configured so that the rotary operating member is movable in both of the first direction and the second direction about a circumferential direction of the longitudinal axis. The switch unit outputs an upshifting signal upon the rotary operating member being operated in the first direction. The switch unit outputs a downshifting signal upon the rotary operating member being operated in the second direction.

With the electric twist-grip operating device according to the fourteenth aspect, it is possible to operate a gear transmission with a rotary operating member like as a conventional mechanical twist-grip operating device.

In accordance with a fifteenth aspect of the present invention, the electric twist-grip operating device according to any one of the second to the fourteenth aspect is configured so that the rotary operating member is selectively movable in the first direction in a first amount and a second amount. The second amount is larger than the first amount. The second control signal is outputted differently upon the rotary operating member being moved in the second amount as compared to the rotary operating member being moved the first amount.

With the electric twist-grip operating device according to the fifteenth aspect, it is possible to output different signals to control a gear transmission by selecting between different amount operations of a rotary operating member.

In accordance with a sixteenth aspect of the present invention, the electric twist-grip operating device according to any one of the second to fifteenth aspects is configured so that the first control signal includes a first telescopic control signal and a second telescopic control signal. The rotary operating member is movable in both of the first direction and the second direction about a circumferential direction of the longitudinal axis. The switch unit outputs the first telescopic control signal upon the rotary operating member being operated in the first direction. The switch unit outputs the second telescopic control signal upon the rotary operating member being operated in the second direction.

With the electric twist-grip operating device according to the sixteenth aspect, it is possible to operate a telescopic apparatus by operating a rotary operating member in both of first and second directions.

In accordance with a seventeenth aspect of the present invention, the electric twist-grip operating device according to the sixteenth aspect is configured so that each of the first telescopic control signal and the second telescopic control signal is to control the height adjustable seatpost.

With the electric twist-grip operating device according to the seventeenth aspect, it is possible to operate a height adjustable seatpost by operating a rotary operating member in both of first and second directions.

In accordance with an eighteenth aspect of the present invention, the electric twist-grip operating device according to the seventeenth aspect is configured so that the first telescopic control signal is a first valve control signal to open a hydraulic port of a fluid passage for a predetermined time period. The second telescopic control signal is a second valve control signal to open the hydraulic port of the fluid passage. The second valve control signal is at least one of a continuous output and an intermittent output during the rotary operating member being moved in the second direction.

With the electric twist-grip operating device according to the eighteenth aspect, it is possible to control a time to open a hydraulic port of a fluid passage of a height adjustable seatpost in accordance with user's demand.

In accordance with a nineteenth aspect of the present invention, the electric twist-grip operating device according to the seventeenth aspect is configured so that the first telescopic control signal is a first valve control signal to open a hydraulic port of a fluid passage for a first time period. The second telescopic control signal is a second valve control signal to open the hydraulic port of the fluid passage for a second time period. The second time period is different from the first time period.

With the electric twist-grip operating device according to the nineteenth aspect, it is possible to selectively control a time to open a hydraulic port of a fluid passage of a height adjustable seatpost between two different times.

In accordance with a twentieth aspect of the present invention, the electric twist-grip operating device according to the seventeenth aspect is configured so that the first telescopic control signal is a first valve control signal to open a hydraulic port in a first amount. The second telescopic control signal is a second valve control signal to open the hydraulic port in a second amount. The second amount is different from the first amount.

With the electric twist-grip operating device according to the twentieth aspect, it is possible to change an adjusting speed of a height adjustable seatpost.

In accordance with a twenty-first aspect of the present invention, the electric twist-grip operating device according to the seventeenth aspect is configured so that the first telescopic control signal is a first actuation signal to extend a height of the height adjustable seatpost. The second telescopic control signal is a second actuation signal to retract the height of the height adjustable seatpost.

With the electric twist-grip operating device according to the twenty-first aspect, it is possible to selectively change an adjusting direction of a height of a height adjustable seatpost.

In accordance with a twenty-second aspect of the present invention, the electric twist-grip operating device according to the sixteenth aspect is configured so that the first telescopic control signal is to control the height adjustable seatpost and the second telescopic control signal is to control the suspension.

With the electric twist-grip operating device according to the twenty-second aspect, it is possible to operate both a height adjustable seatpost and a bicycle suspension via one electric twist-grip operating device.

In accordance with a twenty-third aspect of the present invention, the electric twist-grip operating device according to any one of the first to the twenty-second aspects is configured so that the rotary operating member is movable between a rest position and an operated position. The rotary operating member is biased toward the rest position.

With the electric twist-grip operating device according to the twenty-third aspect, it is possible to distinguish an operated state and non-operated state of a rotary operating member.

In accordance with a twenty-fourth aspect of the present invention, the electric twist-grip operating device according to any one of the first to the twenty-second aspects is configured so that the rotary operating member is configured to be maintained at an operated position.

With the electric twist-grip operating device according to the twenty-fourth aspect, it is possible to operate a rotary operating member like as a conventional mechanical twist-grip operating device.

In accordance with a twenty-fifth aspect of the present invention, the electric twist-grip operating device according to any one of the first to the twenty-fourth aspects is configured so that the rotary operating member includes an annular gripping portion rotatable disposed about the longitudinal axis.

With the electric twist-grip operating device according to the twenty-fifth aspect, it is possible to operate a rotary operating member like as a conventional mechanical twist-grip operating device.

In accordance with a twenty-sixth aspect of the present invention, the electric twist-grip operating device according to the twenty-fifth aspect is configured so that the annular gripping portion has an axial length of at least twenty millimeters.

With the electric twist-grip operating device according to the twenty-sixth aspect, it is possible to operate a rotary operating member like as a conventional mechanical twist-grip operating device.

Also, other objects, features, aspects and advantages of the disclosed electric twist-grip operating device will become apparent to those skilled in the art from the following detailed description, which, taken in conjunction with the annexed drawings, discloses preferred embodiments of the electric twist-grip operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
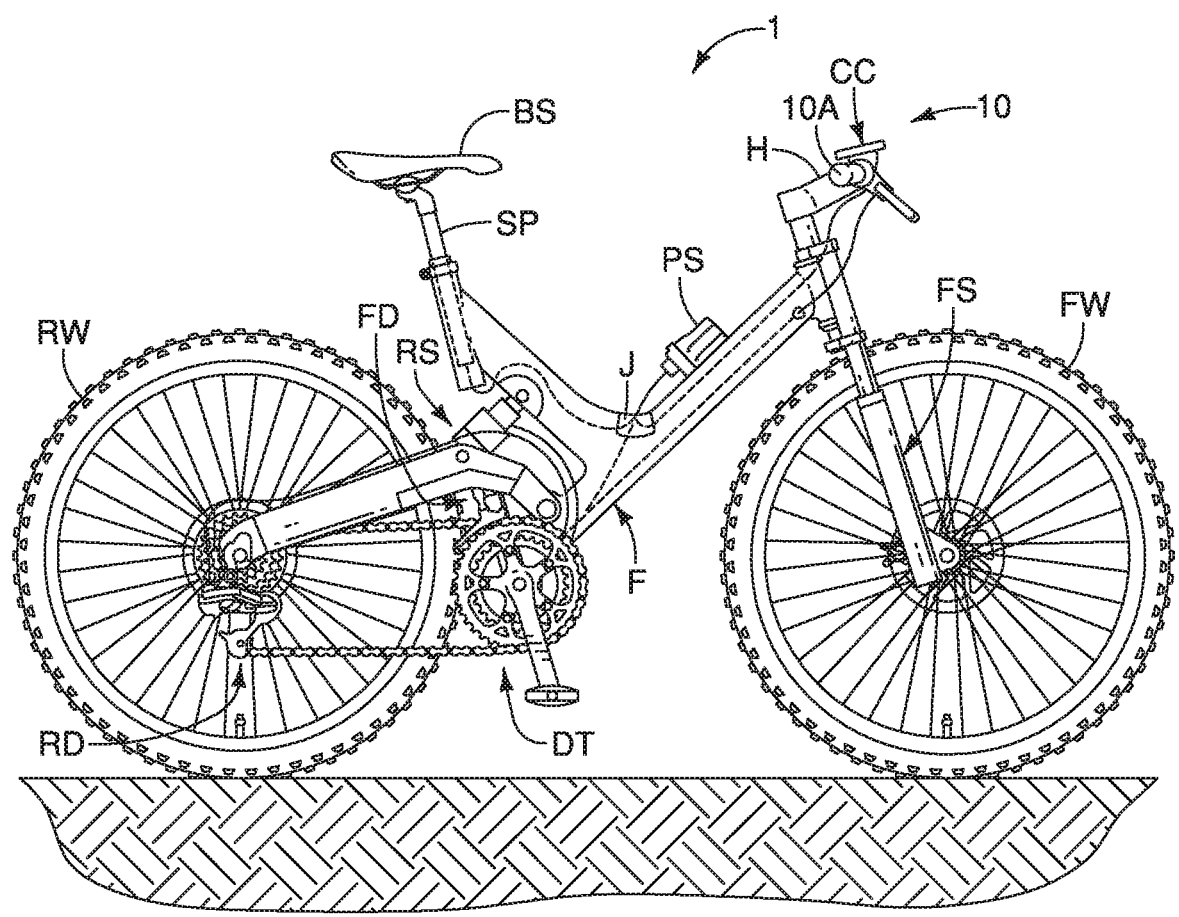
FIG. 1 is a side elevational view of a bicycle equipped with a pair of electric twist-grip operating devices in accordance with a first illustrated embodiment.

Referring initially to FIG. 1, a bicycle 1 is illustrated that is equipped with a first electric twist-grip operating device 10A and a second electric twist-grip operating device 10B in accordance with a first embodiment. The bicycle 1 includes, among other things, a bicycle handlebar (handlebar) H, a bicycle seat BS, a front wheel FW, a bicycle frame F, a rear wheel RW and a drive train DT. In the illustrated embodiment, the drive train DT includes a plurality of front sprockets, a plurality of war sprockets and a bicycle chain. The drive train DT is configured to convert the rider's pedaling force into driving force. The bicycle 1 further includes a height adjustable seatpost SP, a front suspension FS, a rear suspension RS, an electric front derailleur (front derailleur) FD and an electric rear derailleur (rear derailleur) RD. The font and rear derailleurs FD and RD form a bicycle gear transmission. The height adjustable seatpost SP, the front suspension FS, the rear suspension RS, the electric front derailleur FD and the electric rear derailleur RD are examples of bicycle components, and will be collectively referred to as bicycle components SP, FS, RS, FD and RD herein. Moreover, in this disclosure, the height adjustable seatpost SP and the front and rear suspensions FS and RS are each an example of an electric telescopic apparatus, and will be collectively referred to as electric telescopic apparatuses SP, FS and RS herein. The height adjustable seatpost SP, the front suspension FS, the rear suspension RS, the electric front derailleur FD and the electric rear derailleur RD are each electrically powered by its own power source and/or a commonly shared power source. The first electric twist-grip operating device 10A and the second electric twist-grip operating device 10B are configured for selectively operating, adjusting and/or changing the bicycle components SP, FS, RS, FD and RD as discussed below.

The first and second electric twist-grip operating devices 10A and 10B are part of a bicycle control system 12 for selectively controlling the bicycle components SP, FS, RS, FD and RD. Preferably, the bicycle control system 12 includes a cycle computer CC that are operatively connected to the height adjustable seatpost SP, the front suspension FS, the rear suspension RS, the electric front derailleur FD and the electric rear derailleur RD.

In the illustrated embodiment, the first and second electric twist-grip operating devices 10A and 10B can be set by the user or rider to operate, adjust and/or change one or more of the bicycle components SP, FS, RS, FD and RD. For example, the first and second electric twist-grip operating devices 10A and 10B can be set to normally operate the electric rear derailleur RD and the electric front derailleur FD, respectively. As stated above, the first and second electric twist-grip operating devices 10A and 10B can also adjust and/or change the height adjustable seat post SP, the front suspension FS and the rear suspension RS as needed and/or desired. Thus, the first and second electric twist-grip operating devices 10A and 10B can operate a bicycle apparatus that includes at least one of the height adjustable seatpost SP and a suspension (front suspension FS or rear suspension RS).

Figure 3:
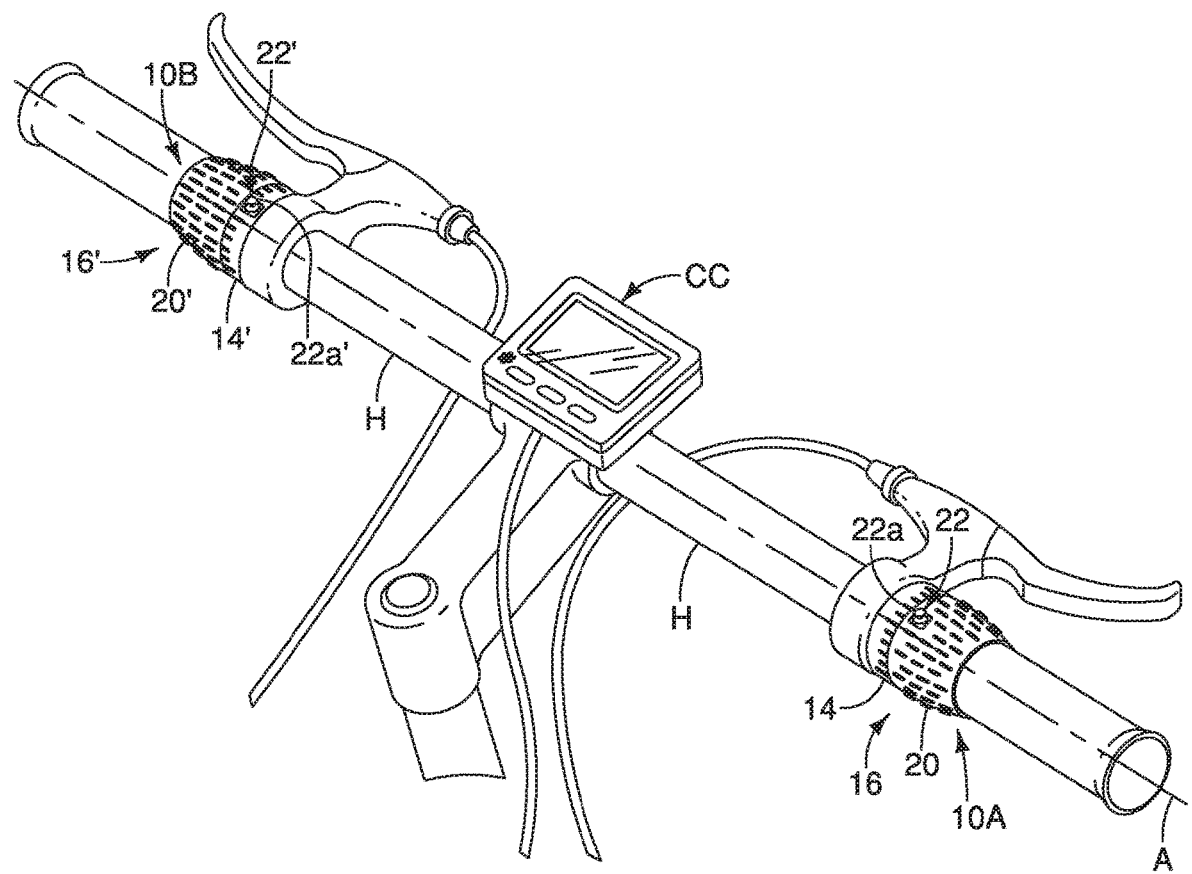
FIG. 3 is a perspective view of a handlebar area of the bicycle illustrated in FIG. 1, in which the pair of electric twist-grip operating devices are mounted to a straight type handlebar.

Referring to FIG. 3, the first and second electric twist-grip operating devices 10A and 10B are illustrated as being provided on the bicycle handlebar H. In the illustrated embodiment, the first and second electric twist-grip operating devices 10A and 10B are mirror images of each other and they have a different number of shift operations that will be further discussed below. In the first illustrated embodiment, the first electric twist-grip operating device 10A is configured to operate the gear transmission and the height adjustable seatpost SP, as will be further discussed below. In particular, the first electric twist-grip operating device 10A is configured to operate the rear derailleur RD of the gear transmission. As will also be further discussed below, the height adjustable seatpost SP of the first illustrated embodiment is an electric height adjustable seatpost.

In the first illustrated embodiment, the second electric twist-grip operating device 10B is set to normally operate the front derailleur FD as well as the front suspension FS and/or rear suspension RS. Thus, in the first illustrated embodiment, the second electric twist-grip operating device 10B also operates the front derailleur FD of the gear transmission. The second electric twist-grip operating device 10B will be further discussed below. It will be apparent to those skilled in the bicycle field that the first and second electric twist-grip operating devices 10A and 10B can be identical in structure except for being mirror images of one another, and can further have identical shift operations as needed and/or desired.

Figure 4:
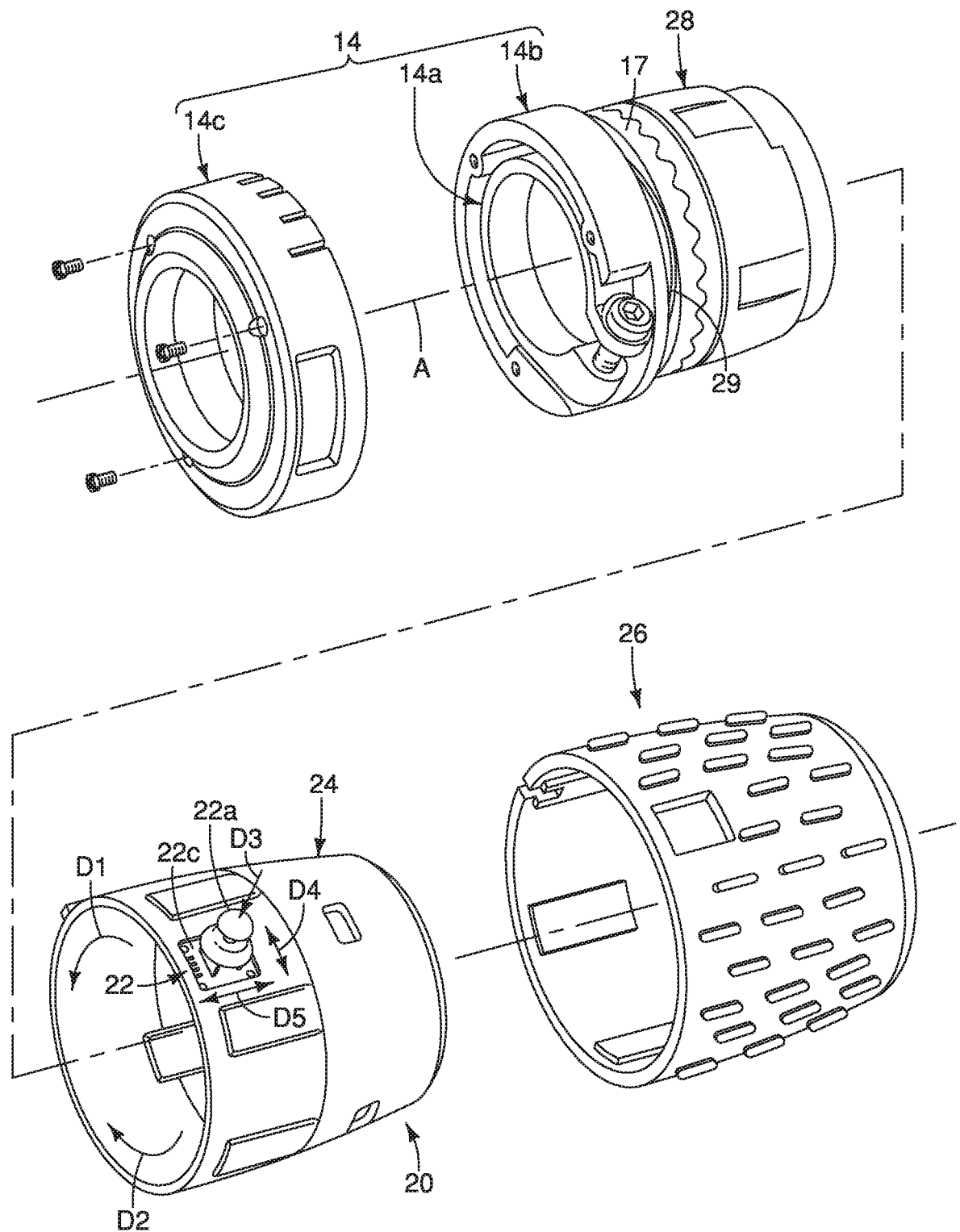
FIG. 4 is an exploded top perspective view of the right electric twist-grip operating device illustrated in FIGS. 1 and 3.

The first electric twist-grip operating device 10A will now be discussed with reference to FIGS. 2 to 9. As shown in FIG. 3, the first electric twist-grip operating device 10A is mounted to the bicycle handlebar H and is operated by the rider using a twisting motion about a center longitudinal axis (longitudinal axis) A of the bicycle handlebar H. As seen in FIG. 4, the first electric twist-grip operating device 10A basically comprises a base member 14 and a switch unit 16, which will be further discussed below. As discussed below, in the first illustrated embodiment, the switch unit 16 is configured to output a first control signal to control a bicycle apparatus (i.e., the height adjustable seatpost SP). The switch unit 16 is further configured to output a second control signal to control the gear transmission (i.e., the rear derailleur RD).

Figure 2:
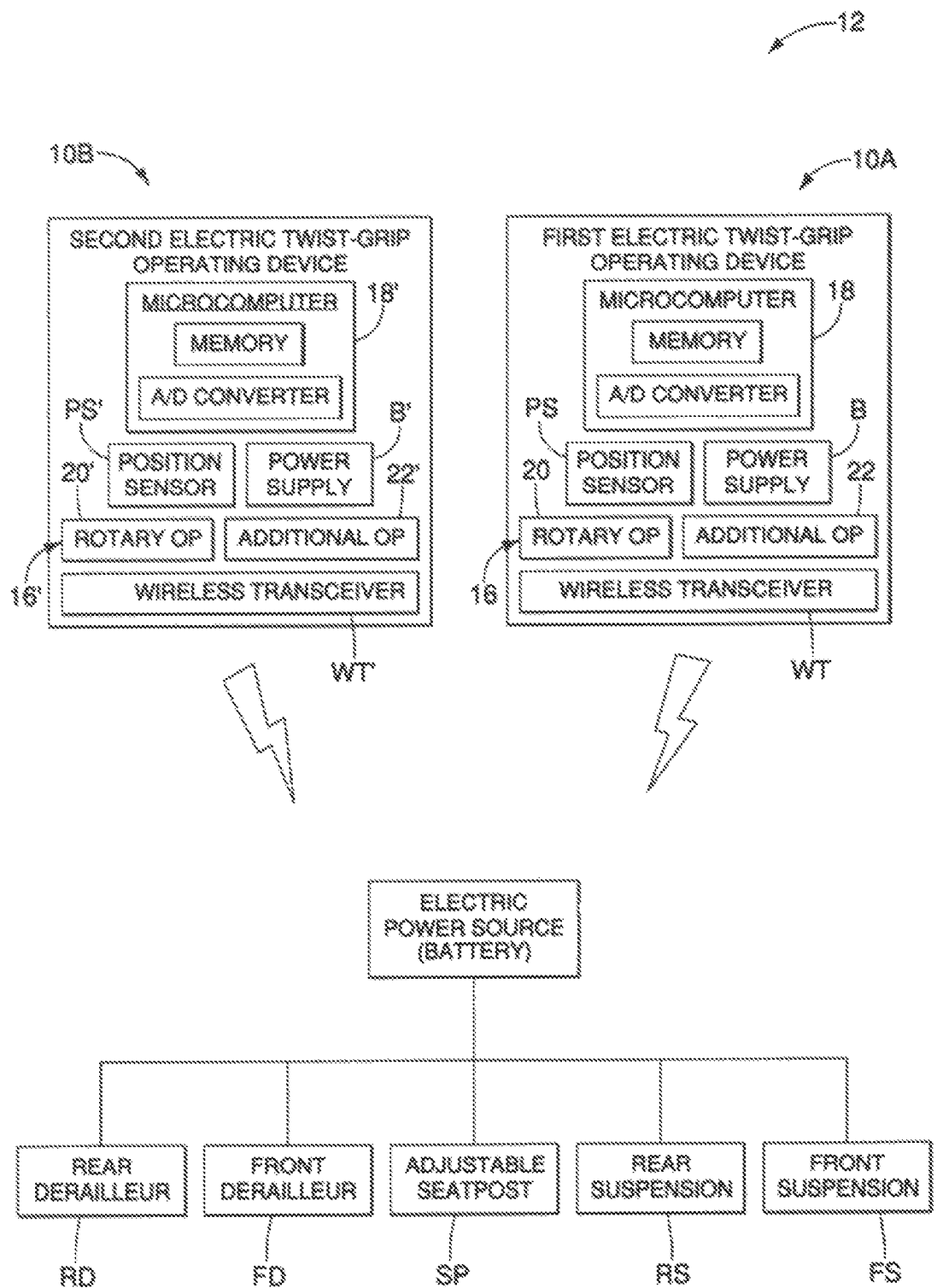
FIG. 2 is a schematic block diagram showing an entire configuration of a bicycle control system for the bicycle illustrated in FIG. 1.

As seen in FIG. 2, the first electric twist-grip operating device 10A further includes an electronic controller 18. It will be apparent to one skilled in the bicycle field from this disclosure that the electronic controller 18 can be provided separately from the first electric twist-grip operating device 10A. For example, the electronic controller 18 can be provided on the cycle computer CC. As to be explained below, the electronic controller 18 is configured to output a signal related to operations of the rear derailleur RD and a height of the height adjustable seatpost SP and a firmness of the front and/or the rear suspension FS and RS.

Here, in the illustrated embodiments, the electronic controller 18 is configured to selectively communicate with the height adjustable seatpost SP, the front suspension FS and/or the rear suspension RS via wireless communications. The electronic controller 18 is also configured to communicate with the rear derailleur RD via wireless communications. Thus, as seen in FIG. 2, the first electric twist-grip operating device 10A includes a wireless transceiver WT (i.e., a communication device) that carries out two-way wireless communications between the electronic controller 18 and the height adjustable seatpost SP, the front suspension FS and/or the rear suspension RS and the rear derailleur RD. The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, the wireless transceiver WT is illustrated as a wireless communication device that carries out two-way wireless communications. However, the wireless transceiver WT can be replaced with a one-way communication device as needed and/or desired.

In this way, the electronic controller 18 is configured to output control signal(s) via the wireless transceiver WT to the height adjustable seatpost SP, the front suspension FS and/or the rear suspension RS and the rear derailleur RD). Alternatively, the cycle computer CC can be equipped with a wireless communication device. The electronic controller 18 can output control signals(s) to the cycle computer CC, which then transmits the control signals to the height adjustable seatpost SP, the front suspension FS and/or the rear suspension RS and the rear derailleur RD. Thus, in the illustrated embodiment, the first electric twist-grip operating device 10A is in wireless communication with the height adjustable seatpost SP, the front suspension FS and/or the rear suspension RS and the rear derailleur RD. However, the electronic controller 18 and each of the height adjustable seatpost SP, the front suspension FS and/or the rear suspension RS and the rear derailleur RD can communicate via electrical wires such as dedicated signal lines or via power line communications (PLC).

As shown in FIG. 2, the electronic controller 18 includes a microcomputer, a memory and an A/D (analog to digital) converter. The microcomputer includes, for example, a central processing unit (CPU) or a micro-processing unit (MPU). The memory and the A/D converter are electrically connected to the circuit of the microcomputer of the electronic controller 18. The microcomputer, the memory and the A/D converter can be located on the same circuit board as the wireless communications device in the illustrated embodiment. At least two of the microcomputer, the memory and the A/D converter can be formed of one-chip microcomputer.

The memory of the electronic controller 18 stores information used for various control programs and various control processes. The memory includes, for example, a non-volatile memory and a volatile memory. The memory is one or more storage devices (i.e., one or more computer memory devices). The memory can be, for example, any a non-transitory computer readable medium such as a ROM (Read Only Memory) device, a RAM (Random Access Memory) device, a hard disk, a flash drive, etc. The memory is configured to store settings, programs, data, calculations and/or results of the processor(s) of the electric controller 18. In the first illustrated embodiment, the memory preferably includes a plurality of pre-stored correspondence tables for controlling one or more operating states of one or more of the height adjustable seatpost SP and the rear derailleur RD based on either a rider's operation of the first electric twist-grip operating device 10A or current riding conditions (such as inclination). The correspondence tables will be further discussed below.

Turning now to FIG. 4, the base member 14 will now be discussed. The base member 14 is configured to be mounted around the bicycle handlebar H. Basically, the base member 14 includes a bicycle mounting part 14a, a support member 14b and a cover 14c. The bicycle mounting part 14a is configured for clamping onto the bicycle handlebar H. The bicycle mounting part 14a is a conventional tube clamp that is mounted to the support member 14b. Thus, the base member 14 is non-movably fixed to the bicycle handlebar H by the bicycle mounting part 14a. The cover 14c is configured to be disposed over the bicycle mounting part 14a. In the illustrated embodiment, the cover 14c is provided with indicia for indicating a gear position of the war derailleur RD. A first indexing part 17 is provided on a tubular portion of the support member 14b. The first indexing part 17 is configured to cooperate with the switch unit 16 to provide indexing of the switch unit 16 with respect to the base member 14 as discussed below.

The switch unit 16 will now be discussed in more detail with reference to FIGS. 4 to 8. The switch unit 16 has a center rotation axis that coincides with the center longitudinal axis A of the handlebar H. Basically, the switch unit 16 includes a rotary operating member 20. As will be further discussed below, the switch unit 16 further includes an additional operating member 22. The rotary operating member 20 is rotatable with respect to the base member 14 about the longitudinal axis A of the handlebar H.

In the first illustrated embodiment, the rotary operating member 20 and the additional operating member 22 of the switch unit 16 output a control signal when operated by a rider. In particular, in the first illustrated embodiment, the additional operating member 22 of the switch unit 16 is configured to output the first control signal to control the height adjustable seatpost SP. The rotary operating member 20 is configured to output the second control signal to control the rear derailleur RD. However, the rotary operating member 20 and the additional operating member 22 can be set up so that operation of the rotary operating member 20 outputs the first control signal and operation of the additional operating member 22 outputs the second control signal. Thus, in the first illustrated embodiment, the switch unit 16 is configured to output one of the first control signal and the second control signal in response to a movement of the rotary operating member 20. Thus, the additional operating member 22 outputs the other of the first control signal and the second control signal.

In particular, the rotary operating member 20 is rotatable with respect to the base member 14 about the longitudinal axis A of the handlebar H in at least one of a first direction D1 and a second direction D2. In particular, the switch unit 16 is configured to output one of the first control signal and the second control signal in response to the rotation of the rotary operating member 20 in at least one of a first direction D1 and a second direction D2, as will be further discussed below. Thus, the second control signal is different from the first control signal. As stated above, the first control signal operates an electric telescopic apparatus (i.e., the height adjustable seatpost SP or the front suspension FS and/or the rear suspension RS). As explained later, the additional operating member 22 can be set by the user to operate any one of the height adjustable seatpost SP, the front suspension FS and the rear suspension RS.

The rotary operating member 20 will now be discussed in more detail. Basically, as best seen in FIG. 4, the rotary operating member 20 includes an annular gripping portion 24 that is rotatably disposed about the longitudinal axis A. The rotary operating member 20 further includes a flexible grip cover 26 and a second indexing part 28, as will be further discussed below. The flexible grip cover 26 is disposed over the annular gripping portion 24, while the second indexing part 28 is disposed inside the annular gripping portion 24. The annular gripping portion 24, the flexible grip cover 26 and the second indexing part 28 are rotatable together as a unit with respect to the base member 14. It is desirable to provide a comfortable feeling for the ride's hand while the rider is gripping the rotary operating member 20. Thus, the flexible grip cover 26 is preferably a soft elastomeric member formed of a suitable elastomeric material. In the illustrated embodiment, it is preferable that the annular gripping portion 24 has an axial length of at least twenty millimeters.

The rotary operating member 20 is mounted onto the handlebar H such that the rider can rotate the rotary operating member 20 on the handlebar H. The first and second indexing parts 17 and 28 maintain a selected position of the rotary operating member 20 relative to the handlebar H and the base member 14. In particular, the first and second indexing parts 17 and 28 are each a ring-shaped member formed of a hard, rigid material such as a hard, rigid plastic material. The first indexing part 17 is axially movable on the support member 14b, but not rotatable with respect to the support member 14b. The first indexing part 17 has a plurality of first teeth members, while the second indexing part 28 has a plurality of second teeth members. In the first embodiment, a biasing member 29 such as a wave spring is axially disposed between the support member 14b and the second indexing part 28. The biasing member 29 is held in a preloaded condition between the support member 14h and the second indexing part 28. In this way, the biasing member 29 biases the first teeth members of the first indexing part 17 into engagement with the second teeth members of the second indexing part 28. However, it will be apparent to those skilled in the art from this disclosure that one of the first and second indexing parts 17 and 28 can be provided with only a single tooth member if needed and/or desired.

When the rotary operating member 20 is twisted, the second indexing part 28 is rotated about the longitudinal axis A of the bicycle handlebar H and the first indexing part 17 is moved axially against the force of the biasing member 29. Then the force of the biasing member 29 returns first indexing part 17 back into its rest position to hold the rotary operating member 20 in a different position with respect to the base member 14. In this way, when the rider rotates or twists the rotary operating member 20 on the handlebar H and the base member 14, the rotary operating member 20 will stay in the selected position relative to the handlebar H and the base member 14 once the rider lets go of the rotary operating member 20. In other words, the rotary operating member 20 is configured to be maintained at an operated position. Thus, the first and second indexing parts 17 and 28 constitutes an indexing structure of the first electric twist-grip operating device 10A.

As diagrammatically shown in FIG. 2, the first electric twist-grip operating device 10A further includes a position sensor PS and a power supply B (e.g., one or more batteries or a capacitor). The power supply B can be a rechargeable battery that can be detachable from the first electric twist-grip operation device 10A for power charge, or rechargeable via a charging port formed on the first electric twist-grip operation device 10A. The power supply B is electrically connected to the electronic controller 18, the wireless transceiver WT and the position sensor PS for supplying electrical power to the electronic controller 18, the wireless transceiver WT and the position sensor PS. The position sensor PS is configured to sense operational movement of the rotary operating member 20 of the switch unit 16. For example, the position sensor PS can be a potentiometer that has a plurality of electrical contacts and a plurality of brushes. The electrical contacts are provided on one of the support member 14b and the second indexing part 28, while the brushes are provided on the other one of the support member 14b and the second indexing part 28. In this way, the position sensor PS indicates a relative position of the rotary operating member 20 with respect to the base member 14.

Figure 5:
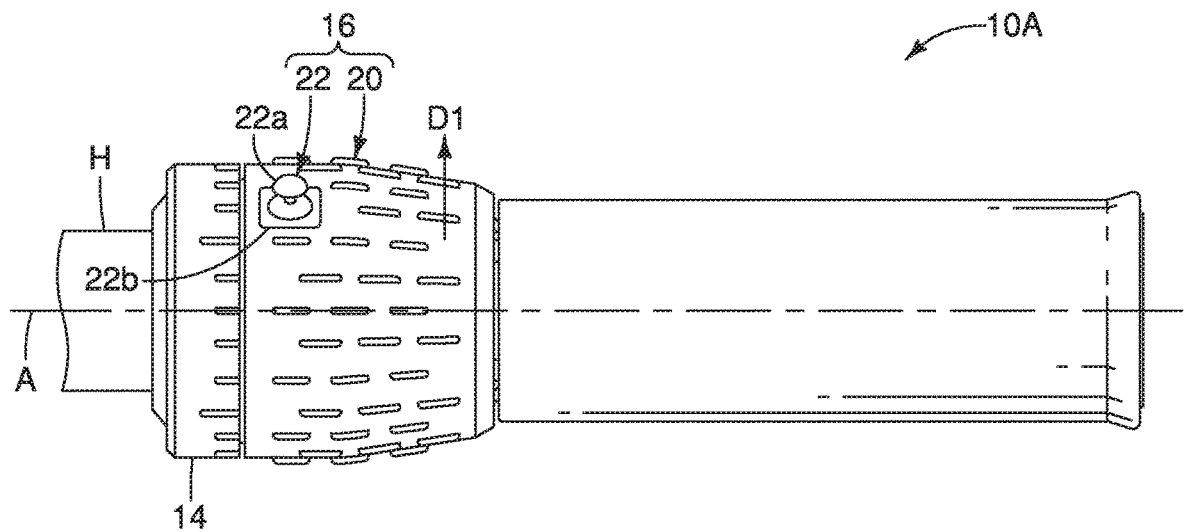
FIG. 5 is a top plan view of the right electric twist-grip operating device illustrated in FIG. 4 rotated in a first direction.
Figure 6:
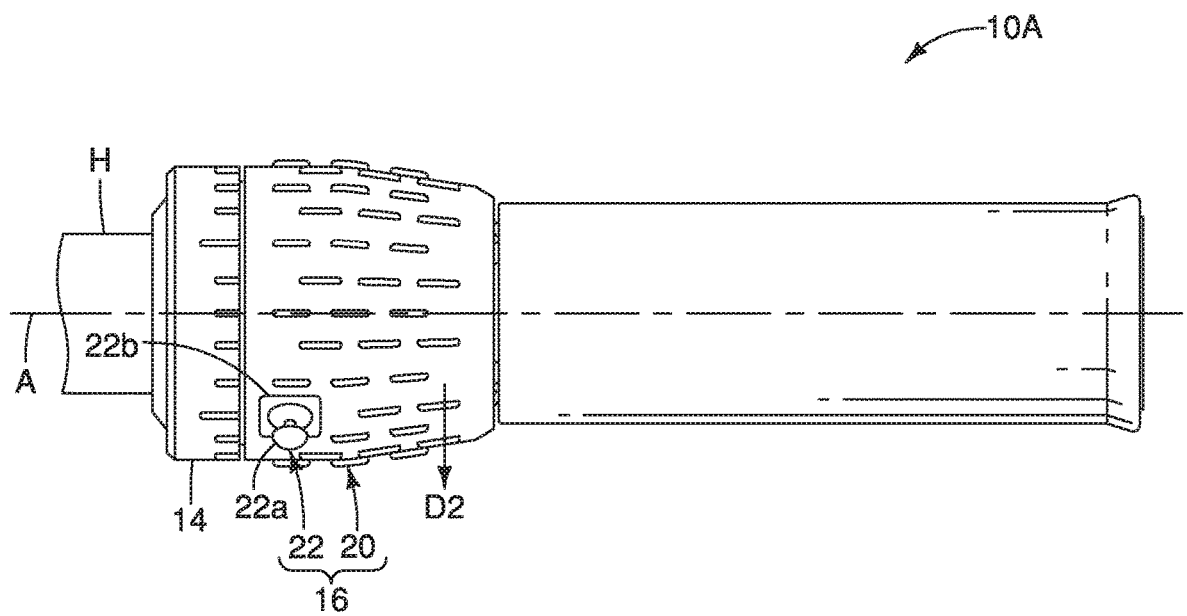
FIG. 6 is a top plan view of the right electric twist-grip operating device illustrated in FIGS. 4 and 5 rotated in a second direction.

As mentioned above, the rotary operating member 20 is movably (i.e., rotatably in the illustrated embodiment) mounted to the base member 14. The rotary operating member 20 rotates or twists on the handlebar H about the longitudinal axis A as shown in FIGS. 5 and 6. As mentioned above, the rotary operating member 20 is rotatable with respect to the base member 14 about the longitudinal axis A of the handlebar H in the first direction D1 and the second direction D2. The second direction D2 is opposite to the first direction D1. In the first illustrated embodiment, the rotary operating member 20 is movable in both of the first direction D1 and the second direction D2 about a circumferential direction of the longitudinal axis A.

In the first illustrated embodiment, the rotary operating member 20 is rotatable in the first and second directions D1 and D2 to operate the rear derailleur RD. In particular, the rotary operating member 20 rotates in the first direction D1 to upshift the rear derailleur RD. Thus, the switch unit 16 outputs an upshifting signal upon the rotary operating member 20 being operated in the first direction D1. In particular, the position sensor PS outputs the upshifting signal to the electronic controller 18 which then outputs upshifting signal to the rear derailleur RD via the wireless transceiver WT. Additionally, the rotary operating member 20 is rotatable in the second direction D2 to downshift the rear derailleur RD. Thus, the switch unit 16 outputs the downshifting signal upon the rotary operating member 20 being operated in the second direction D2. In particular, the position sensor PS outputs the downshifting signal to the electronic controller 18 which then outputs downshifting signal to the rear derailleur RD via the wireless transceiver WT.

Further, it is preferable that the rotary operating member 20 is selectively movable in the first direction D1 in a first amount and a second amount. For example, the user can rotate the rotary operating member 20 in the first direction D1 by the first amount to upshift the rear derailleur RD by single gear stage. The user can rotate the rotary operating member 20 in the first direction D1 by the second amount to upshift the rear derailleur RD by multiple gear stages. In this example, the second amount is larger than the first amount. In this way, the second control signal is outputted differently upon the rotary operating member 20 being moved the second amount as compared to the rotary operating member 20 being moved the first amount. Similarly, the rotary operating member 20 is selectively movable in the second direction D2 to downshift the rear derailleur RD in a first amount and a second amount that are different to downshift by a single gear stage and to downshift by multiple gear stage, respectively.

The additional operating member 22 will now be discussed with reference mainly to FIGS. 4 and 7 to 9. In the first illustrated embodiment, as seen in FIG. 4, the additional operating member 22 is disposed on the rotary operating member 20. The additional operating member 22 is a user input device that is mounted on the annular gripping portion 24 to move with the rotary operating member 20. In particular, in the first illustrated embodiment, the additional operating member 22 is configured as a joystick, which includes a plurality of input switches. Preferably, the additional operating member 22 is configured to be operated by a user's thumb.

The additional operating member 22 includes a user operating portion 22a connected to a base 22b. The user operating portion 22a is connected to the base 22b by a ball and socket arrangement to provide pivotally movement in a plurality of directions. Additionally or alternatively, the user operating portion 22a also functions as an input button or switch such that the user operating portion 22a can be pressed inward toward the base 22b (i.e., towards the longitudinal axis A). In other words, the additional operating member 22 can also be actuated when the joystick is pressed downward with respect the handlebar H and the base member 14. The base 22b includes a circuit board 22c having circuitry that includes at least one potentiometer. As seen in FIG. 4, the circuit board 22c is disposed in a recess of the rotary operating member 20. The potentiometer is a position transducer that converts the directional movement(s) of the user operating portion 22a into an electrical signal that is processed by the circuitry of the circuit board 22c. Thus, in the first illustrated embodiment, the circuitry of the circuit board 22c includes a y-axis potentiometer to transduce the movement of the user operating portion 22a in a circumferential direction with respect to the longitudinal axis A of the handlebar H. The circuitry of the circuit board 22c further includes an x-axis potentiometer to transduce the movement of the user operating portion 22a in a direction parallel to the longitudinal axis A of the handlebar H.

Figure 9:
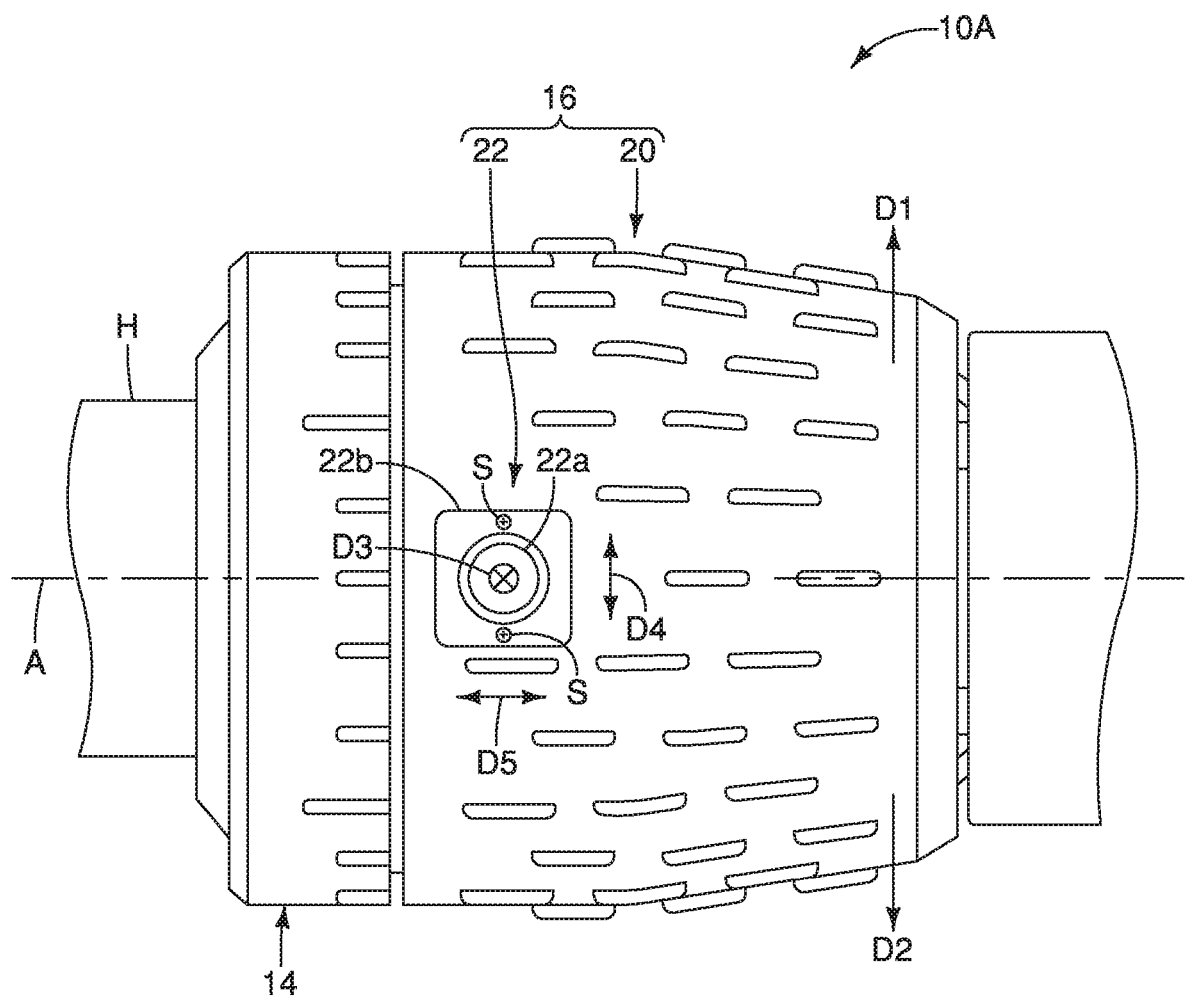
FIG. 9 is an enlarged top plan view of the right electric twist-grip operating device illustrated in FIGS. 4 to 8.

In the illustrated embodiment, as seen in FIG. 9, the base 22b is attached to the rotary operating member 20 by a pair of screws S. If desired, the base 22b can be detached from the rotary operating member 20. A blank faceplate having a flat surface (i.e., no user operating portion 22a) can replace the base 22b. Thus, the additional operating member 22 is detachably attached to one of the base member 14 and the rotary operating member 20.

Figure 7:
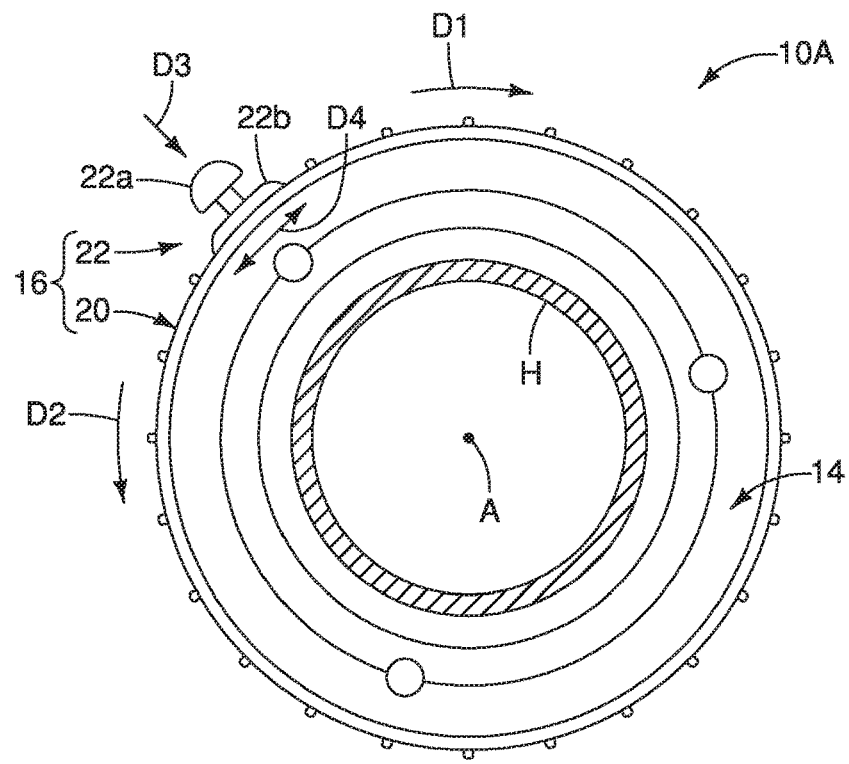
FIG. 7 is an inside end devational view of the right electric twist-grip operating device illustrated in FIGS. 4 to 6 with the handlebar shown in cross-sectional.
Figure 8:
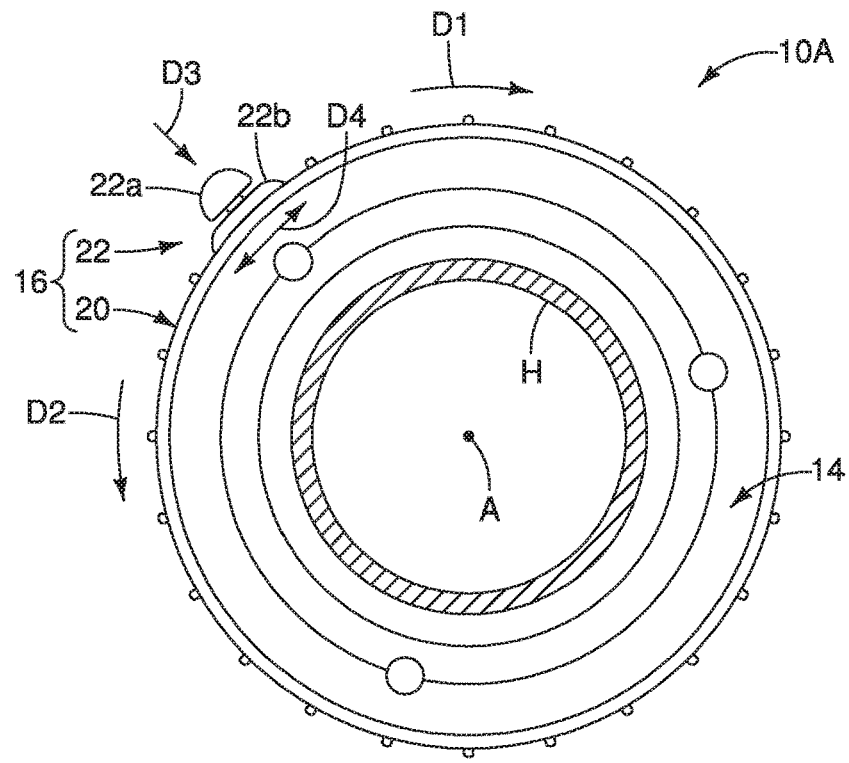
FIG. 8 is an inside end elevational view of the right electric twist-grip operating device illustrated in FIGS. 4 to 7 with the handlebar shown in cross-sectional and having an operating member operated in a third direction.

In the first illustrated embodiment, as seen in FIGS. 7 to 9, the user operating portion 22a can be operated in a third direction D3, a fourth direction D4 and a fifth direction D5. As shown in FIGS. 7 and 8, the additional operating member 22 is movable with respect to the base member 14 in the third direction D3. The third direction D3 corresponds to a direction of a movement of the user operating portion 22a in a radial direction with respect to the longitudinal axis A of the handlebar H. However, the third direction D3 can be other directions that are perpendicular to the longitudinal axis A of the handlebar H. Thus, the user operating portion 22a is pressed towards the base 22b when operated in the third direction D3. The third direction D3 extends along a direction perpendicular to the longitudinal axis A.

In the first illustrated embodiment, the additional operating member 22 can be operated in the third direction D3 to select an electric telescopic apparatus for control by the first electric twist-grip operating device 10A. As previously stated, in the first illustrated embodiment, the height adjustable seatpost SP has been pre-selected to be controlled by operation of the additional operating member 22. However, upon pressing of the user operating portion 22a, the user can select the front suspension FS to be operated by the additional operating member 22. Further, upon pressing of the user operating portion 22a again, the user can select the rear suspension RS to be operated by the additional operating member 22. Therefore, the additional operating member 22 acts as a mode switch when operated in the third direction D3. The user's selection of one of the electric telescopic apparatuses SP, FS and RS can be displayed on the cycle computer CC. It will be apparent to those skilled in the bicycle field from this disclosure that the additional operating member 22 can be pre-programmed to select any one of the electric telescopic apparatuses SP, FS and RS as a default selection as needed and/or desired.

Further, as seen in FIG. 9, the additional operating member 22 is movable with respect to the base member 14 in the fourth direction D4. The fourth direction D4 extends along one of the first direction D1 and the second direction D2 of the rotary operating member 20. Thus, the fourth direction D4 is a circumferential direction with respect to the longitudinal axis A of the handlebar H.

In the first illustrated embodiment, the user can move the user operating portion 22a in the fourth direction D4 to change a prescribed height of the height adjustable seatpost SP. For example, by moving the user operating portion 22a upwards along the fourth direction D4, the user can increase the height of the height adjustable seatpost SP. The user can hold the user operating portion 22a upwards to continuously or intermittently increase the height of the height adjustable seatpost SP to a desired level. Similarly, by moving the user operating portion 22a downwards along the fourth direction D4, the user can decrease the height of the height adjustable seatpost SP. The user can hold the user operating portion 22a downwards in this position to continuously or intermittently decrease the height of the height adjustable seatpost SP to a desired level.

Furthermore, it will be apparent to those skilled in the bicycle field from this disclosure that the height adjustable seatpost SP can be pre-set with a prescribed high height, a prescribed low height and a prescribed medium height. In this situation, pushing the user operating portion 22a upwards in the fourth direction D4 automatically adjusts the height adjustable seatpost SP into the prescribed high height. If in the high height position, the user can operate the user operating portion 22a downwards along the fourth direction D4 once to adjust the height adjustable seatpost SP into the prescribed medium height. The user can then operate the user operating portion 22a downwards along the fourth direction D4 again to adjust the height adjustable seatpost SP into the prescribed low height. In this situation, the additional operating member 22 can continuously transmit the second control signal to control the height adjustable seatpost SP. For example, by pushing the user operating portion 22a upwards along the fourth direction D4, the additional operating member 22 can transmit the second control signal to the height adjustable seatpost SP continuously for a predetermined period until the high height is achieved. By pushing the user operating portion 22a downwards along the fourth direction D4, the additional operating member 22 can continuously transmit the second control signal to the height adjustable seatpost SP for a predetermined period until the medium or the low height is achieved.

Thus, by using the additional operating member 22, the switch unit 16 is configured to output the first control signal for a predetermined period per one operation applied to the additional operating member 22. Alternatively, the additional operating member 22 can be configured to intermittently output the first control signal until a desired prescribed height level is reached. Thus, the switch unit 16 can be also configured to continuously or intermittently output the first control signal per one operation applied to the additional operating member 22.

Alternatively, if the front suspension FS is selected to be operated by the additional operating member 22, the user can move the user operating portion 22a upwards in the fourth direction D4 to increase the firmness of the front suspension FS. The user can move the user operating member portion 22a downwards in the fourth direction D4 to decrease the firmness of the front suspension FS. As with the height adjustable seatpost SP, the front suspension FS can be pre-set to have a plurality of prescribed firmness levels. Similarly, the rear suspension RS can be selected to be operated by the additional operating member 22. The rear suspension RS can be pre-set to have a plurality of prescribed firmness levels. The additional operating member 22 can be operated to operate the front and rear suspensions FS and RS to have a desired firmness level in the fourth direction D4.

As previously stated, in the first illustrated embodiment, the additional operating member 22 is disposed on the rotary operating member 20. In the first illustrated embodiment, rotation of the rotary operating member 20 in first and second directions D1 and D2 causes the additional operating member 22 to move with the rotary operating member 20. Thus, as seen in FIGS. 5 and 6, the additional operating member 22 is rotatable with respect to the base member 14 together with the rotary operating member 20 upon rotation of the rotary operating member 20. Also, in the illustrated embodiment, the user can operate the rotary operating member 20 by rotating the rotary operating member 20 at the same time the additional operating member 22 is operated by the user's thumb. In this situation, the rotary operating member 20 outputs the second control signal to operate the gear transmission (via operation of the rear derailleur RD). At the same time, the additional operating member 22 outputs the first control signal to operate the telescopic apparatus (the height adjustable seatpost SP), if the additional operating member 22 is operated during the rotary operating member 20 being rotated (operated). Thus, the switch unit 16 is configured to concurrently output the first control signal and the second control signal upon operations of both of the rotary operating member 20 and the additional operating member 22. However, if the additional operating member 22 is not operated during the rotary operating member 20 being rotated, the additional operating member 22 does not output the first control signal.

As further seen in FIG. 9, the additional operating member 22 is movable with respect to the base member 14 in the fifth direction D5. The fifth direction D5 extends along the longitudinal axis A of the handlebar H. In the illustrated embodiment, a movement along the fifth direction D5 changes an operating state of the selected electric telescopic apparatus. For example, when the height adjustable seatpost SP is selected to be operated by the additional operating member 22, the additional operating member 22 can be operated in the fifth direction D5 to change the operating mode between a manual mode and an automatic mode. The additional operating member 22 can be operated towards a center of the handlebar H to select the manual mode for the height adjustable seatpost SP. Similarly, the additional operating member 22 can be operated away from the center of the handlebar H to select the automatic mode for the height adjustable seatpost SP.

In the manual mode, the height adjustable seatpost SP is adjustable to achieve a desired height via operation of the additional operating member 22 in the fourth direction D4 as discussed above. In the automatic mode, the bicycle control system 12 can automatically adjust the height adjustable seatpost SP to a prescribed height based on a current road condition, in accordance with the prestored correspondence tables in the memory. For example, when the bicycle control system 12 determines that the bicycle 1 is ascending based on information received from an inclination sensor (not shown), the height position of the height adjustable seatpost SP is automatically changed to the prescribed high height position. When the bicycle control system 12 determines that the bicycle 1 is descending based on information received from the inclination sensor (not shown), the height position of the height adjustable seatpost SP is automatically changed to the prescribed low height position.

In the illustrated embodiment, the inclination sensor (not shown) can be provided on the bicycle frame F. The term "inclination sensor" as used herein is a device that can measure a tilt or inclination of the bicycle 1 in a fore to aft direction of the bicycle 1. For example, the inclination sensor can be an accelerometer, an inclinometer, a tiltmeter, etc. Here, the inclination sensor is equipped with a wireless communication device.

Similarly, if the front or rear suspension FS or RS is selected to be operated, the front or rear suspension FS or RS can be set to the automatic mode via operation of the additional operating member 22 in the fifth direction D5. In the automatic mode, the bicycle control system 12 can automatically adjust the front or rear suspension FS or RS to change a damping characteristic based on a current road condition. In particular, in the correspondence tables, the damping characteristic of the front suspension FS and the rear suspension RS can be changed between lock (little to no damping), middle (partial damping), and open (full damping) conditions, while the stroke length can be changed between short and long. A lock state is a firm state as compared to an open state. For example, when the bicycle control system 12 determines that the bicycle 1 is ascending, the front and/or rear suspensions FS and/or RS are placed in the lock state (firm state).

Figure 10:
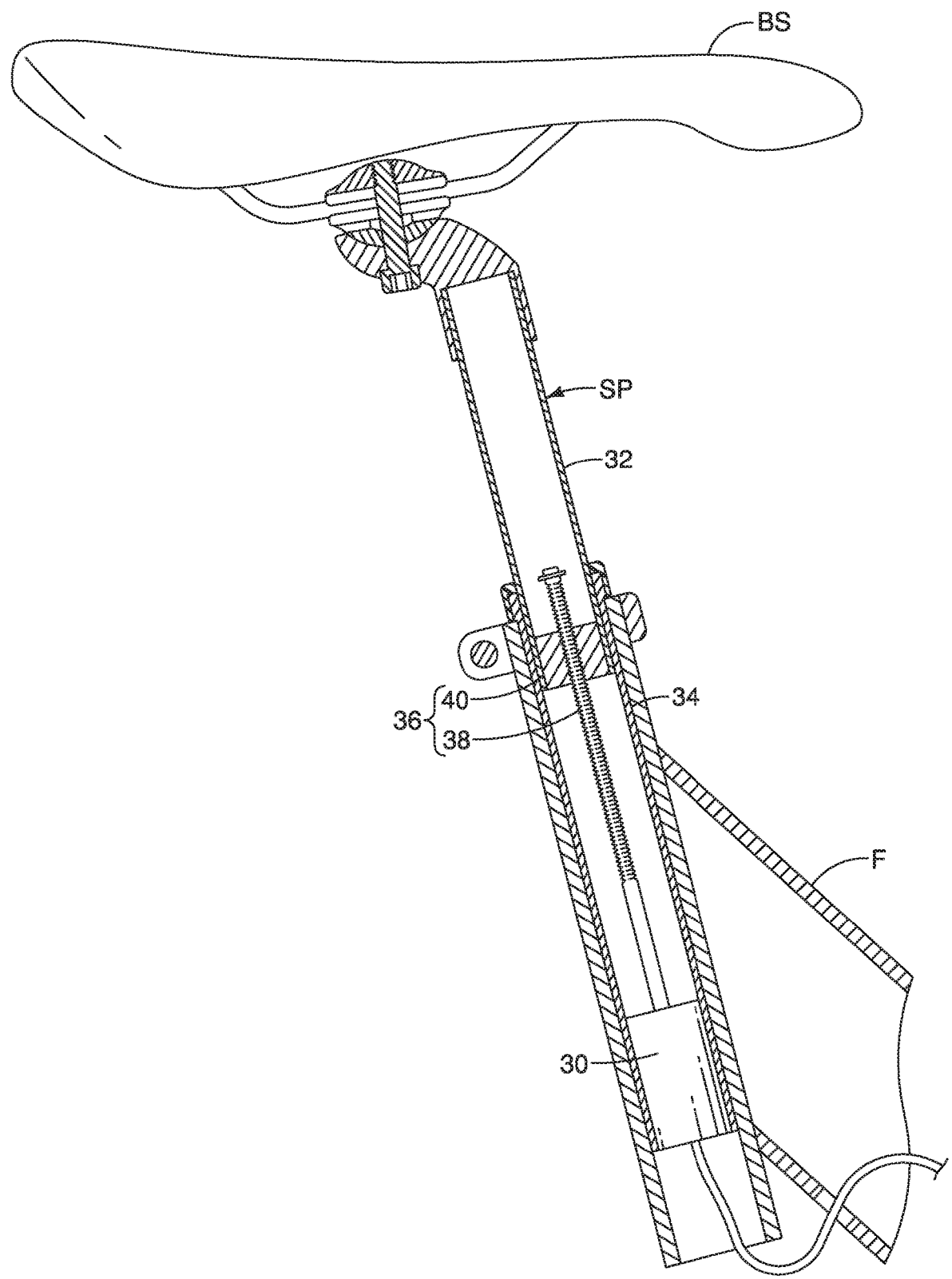
FIG. 10 is an enlarged longitudinal cross-sectional view of a portion of the bicycle illustrated in FIG. 1 that is equipped with an electric height adjustable seatpost.
Figure 11:
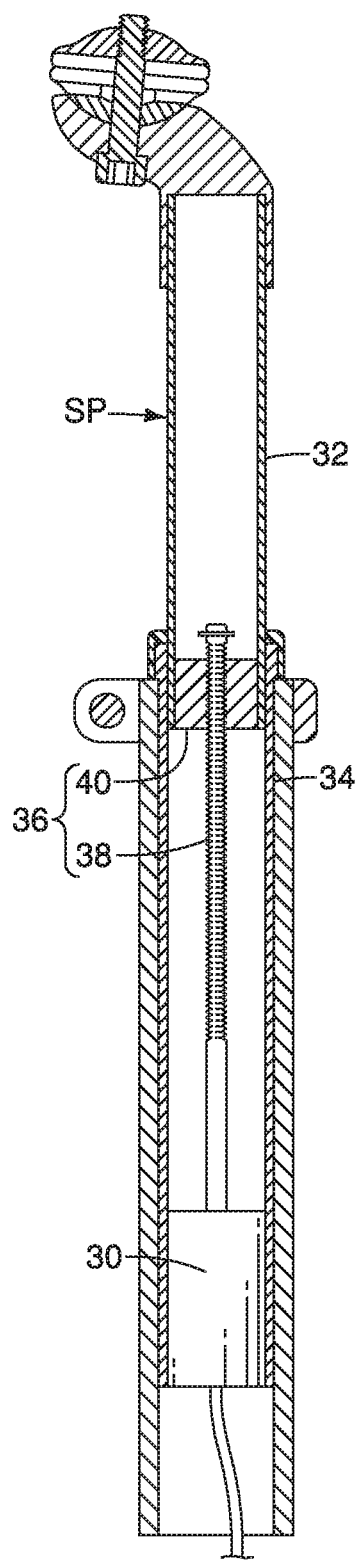
FIG. 11 is a longitudinal cross-sectional view of the height adjustable seatpost illustrated in FIG. 10 in a high height position.
Figure 12:
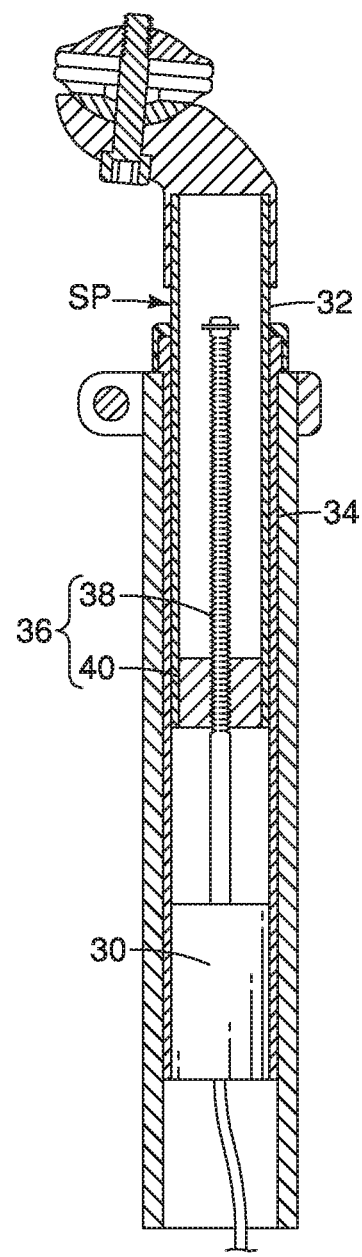
FIG. 12 is a longitudinal cross-sectional view of the height adjustable seatpost illustrated in FIGS. 10 and 11 in a low height position.
Figure 13:
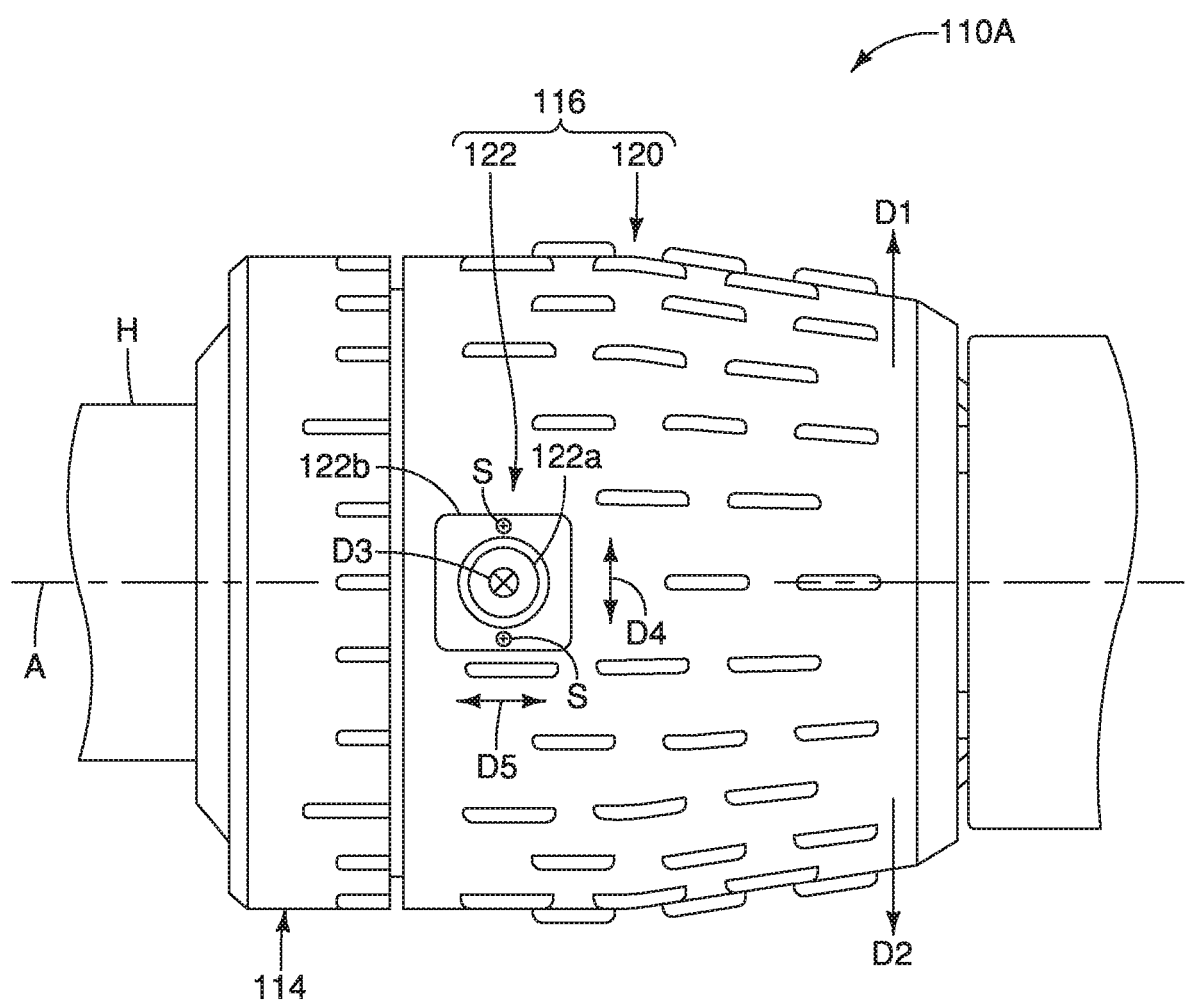
FIG. 13 is an enlarged top plan view of an electric twist-grip operating device in accordance with a second illustrated embodiment.

The height adjustable seatpost SP will now be discussed with reference to FIGS. 10 to 12. In the first illustrated embodiment, the height adjustable seatpost SP is an electric seatpost for automatically or manually adjusting a seat height of the bicycle seat BS with respect to the bicycle frame F. The height adjustable seatpost SP includes an electric actuator 30 for actuating the height of the height adjustable seatpost SP based on control signals received from the electronic controller 18. The electric actuator 30 is a conventional actuator having a motor, a gear reduction unit and a position sensor. In this illustrated embodiment, the motor is preferably a reversible electric motor that is rigidly secured to the lower end of the height adjustable seatpost SP.

In addition to the electric actuator 30, the height adjustable seatpost SP further includes an inner tube 32, an outer tube 34 and a height adjustment device 36. In general, the inner and outer tubes 32 and 34 are telescopically arranged, with the amount of insertion of the inner tube 32 into the outer tube 34 being adjustable. Thus, the inner and outer tubes 32 and 34 are concentrically arranged as seen in the illustrated embodiment as seen in FIGS. 10 to 12. The height adjustment device 36 operatively connects the inner and outer tubes 32 and 34 together for selectively extending (raising) and retracting (lowering) the inner tube 32 with respect to the outer tube 34 based on the first control signal from an operating switch of the first twist-grip operating device 10A via the electronic controller 18.

In the illustrated embodiment, the height adjustment device 36 mainly includes a drive screw 38 and a screw nut 40 that form a linear movement mechanism. The screw nut 40 is threadedly engaged with the drive screw 38 such that the screw nut 40 moves in an axial direction of the drive screw 38 in response to relative rotational movement between the drive screw 38 and the screw nut 40. The drive screw 38 is actuated by the electric actuator 30 in response to receiving the first control signal. Of course, other types of linear movement mechanisms can be used as needed and/or desired.

Referring back to FIGS. 2 and 3, the second electric twist-grip operating device 10B will now be discussed. The second electric twist-grip operating device 10B is similar to the first electric twist-grip operating device 10A. Due to the similarities between the first and second electric twist-grip operating devices 10A and 10B, components corresponding to the first electric twist-grip operating device 10A will receive the same reference numerals while modified components will be indicated by a prime ('). Also, for brevity, the many components of the second electric twist-grip operating device 10B that are identical to the first electric twist-grip operating device 10A will not be discussed herein.

The second electric twist-grip operating device 10B includes a base member 14', a switch unit 16' and an electronic controller 18' as seen in FIG. 2, The switch unit 16' has a rotary operating member 20' and an additional operating member 22'. The rotary operating member 20' is rotatable with respect to the base member 14'. However, as shown, the additional operating member 22' is disposed on the base member 14'. As shown in FIG. 3, the additional operating member 22' is at least partly closer to a bicycle center plane than the rotary operating member 20' in a mounted state where the second electric twist grip operating device 10B is mounted on the bicycle handlebar H. Thus, in the first illustrated embodiment, the additional operating member 22' is stationary with respect to the base member 14' in a circumferential direction. Thus, as seen in FIG. 2, the second electric twist-grip operating device 10B includes a wireless transceiver WT (i.e., a communication device) that carries out two-way wireless communications between the electronic controller 18' and the height adjustable seatpost SP, the front suspension FS and/or the rear suspension RS and the front derailleur FD.

As previously stated, in the first illustrated embodiment, the rotary operating member 20 of the first electric twist-grip operating device 10A is rotatable in the first and second directions D1 and D2 to upshift and downshift the rear derailleur RD. Similarly, in the first illustrated embodiment, the rotary operating member 20' of the second electric twist-grip operating device 10B is rotatable with respect to the longitudinal axis A of the handlebar H to upshift and downshift the front derailleur FD. Preferably, in the illustrated embodiment, the additional operating member 22' is pre-set to operate one of the front suspension FS and the rear suspension RS. The front and rear suspension FS and RS can be selected to be in the automatic mode by the additional operating member 22', as discussed above. Alternatively, the front and rear suspension FS and RS can be adjusted between a plurality of damping characteristics via operation of the additional operating member 22' in a fourth direction D4 that is a circumferential direction with respect to the longitudinal axis A of the handlebar H. It will be apparent to those skilled in the bicycle field from this disclosure that the user can modify the desired one of the electric telescopic apparatuses SP. FS and RS to be operated by the additional operating members 22 or 22', as needed and/or desired.

Referring now to FIGS. 13 to 16, an electric twist-grip operating device 110A in accordance with a second illustrated embodiment will now be discussed. The electric twist-grip operating device 110A can be implemented with the bicycle 1 that has a modified control system and a height adjustable seatpost SP☐ that is a hydraulic height adjustable seatpost.

The electric twist-grip operating device 110A of the second illustrated embodiment is identical in structure to the first electric twist-grip operating device 10A, except that the electric twist-grip operating device 110A has been modified to control the height adjustable seatpost SP'. The electric twist-grip operating device 110A has further been modified to be biased toward a rest position, as further discussed below. For simplicity, all corresponding structures will receive the same reference numerals as the first electric twist-grip operating device 10A of the first illustrated embodiment but increased by 100.

In the second illustrated embodiment, the electric twist grip operating device 110A is configured to operate the front derailleur FD of the gear transmission and the height adjustable seatpost SP'. While the electric twist-grip operating device 110A operates the height adjustable seatpost SP', it will be apparent to those skilled in the bicycle field from this disclosure that the electric twist-grip operating device 110A can be configured to operate another electric telescopic apparatus (i.e., the front suspension FS or the rear suspension RS) as needed and/or desired.

The electric twist-grip operating device 110A basically comprises a base member 114 and a switch unit 116. The electric twist-grip operating device 110A further comprises an electronic controller and a wireless transceiver in the same manner as shown in FIG. 2 for the first electric twist-grip operating device 10A. The switch unit 116 includes a rotary operating member 120 and an additional operating member 122. The additional operating member 122 is identical in structure to the additional operating member 22 of the first illustrated embodiment. However, in the second illustrated embodiment, the additional operating member 122 is configured to operate the gear transmission, while the rotary operating member 120 is configured to operate the telescopic apparatus (i.e., the height adjustable seatpost SP'). Similar to the first embodiment, the rotary operating member 120 is movable in the first direction D1 and the second direction D2 with respect to the longitudinal axis A of the handlebar H, while the additional operating member 122 is movable in the third, fourth and fifth directions D3, D4 and D5 with respect to the longitudinal axis A of the handlebar H. Here, the additional operating member 122 is movable in the fourth direction D4 with respect to the longitudinal axis A of the handlebar H to upshift and downshift either the front derailleur FD or the rear derailleur RD. Alternatively, the additional operating member 122 can be pressed in the third direction D3 by the user to select which of the front derailleur FD or rear derailleur RD to be operated. In addition, the control system of the second illustrated embodiment can include a plurality of pre-stored synchro-shift maps. Therefore, the user can select a desired synchro-shift map by pressing on the additional operating member 122 to operate both the front and rear derailleurs FD and RD by the additional operating member 122.

The base member 114 fixedly secures the switch unit 116 onto the handlebar H, while the rotary operating member 120 is rotatable with respect to the base member 114 about the longitudinal axis A of the handlebar H. In particular, the rotary operating member 120 is rotatable about the longitudinal axis A of a handlebar H between a rest position and one or more operated positions. Therefore, the rotary operating member 120 is movable between a rest position and an operated position. The rotary operating member 120 is rotatable in a first direction D1 about the longitudinal axis A of the handlebar H and is rotatable in a second direction D2 about the longitudinal axis A of the handlebar H. The second direction D2 is opposite the first direction D1. Thus, the rotary operating member 120 is movable in both of the first direction D1 and the second direction D2 about a circumferential direction of the longitudinal axis A.

Figure 14:
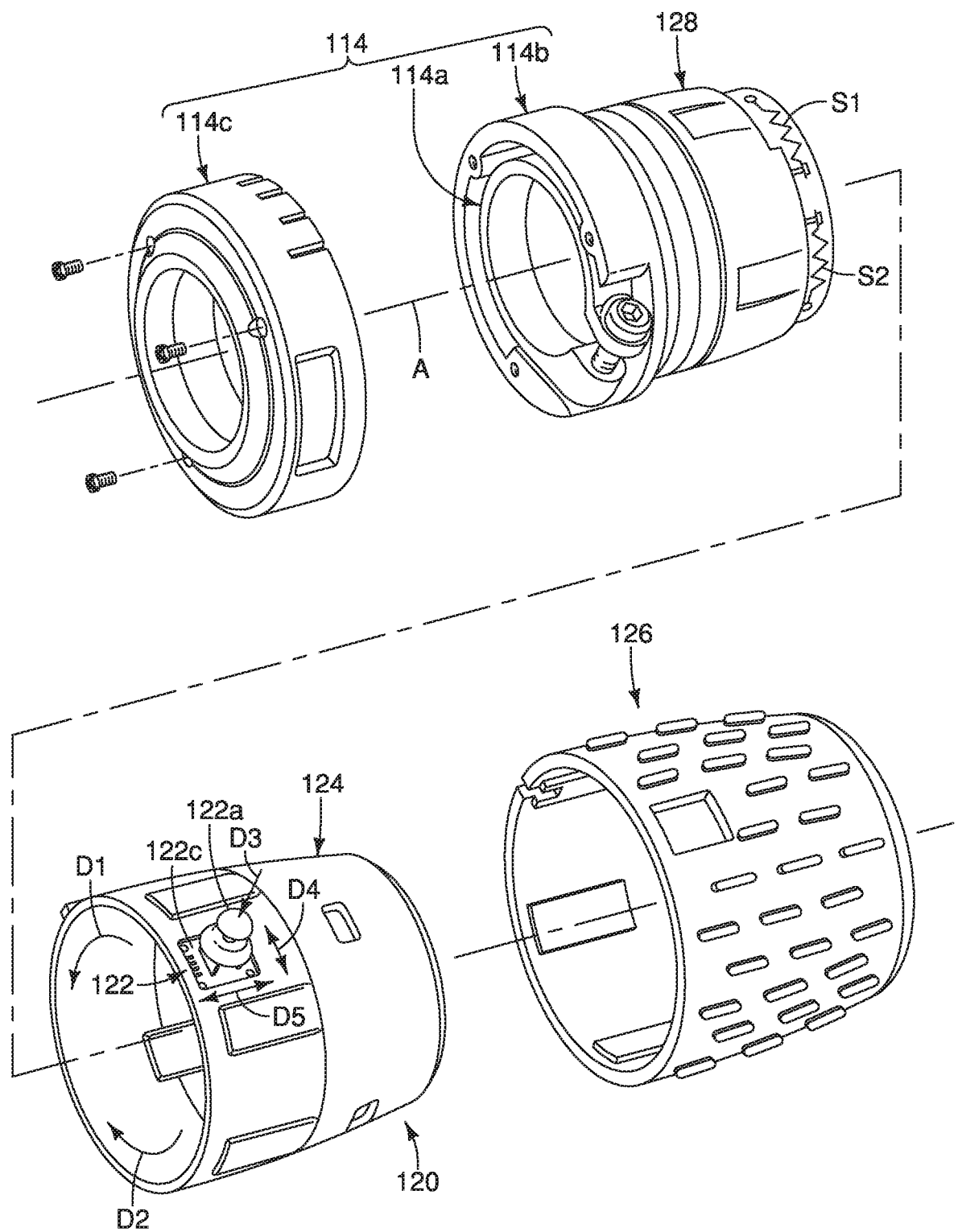
FIG. 14 is an exploded top perspective view of the electric twist-grip operating device illustrated in FIG. 13.

As shown in FIG. 14, the base member 114 includes a bicycle mounting part 114a, a support member 114b and a cover 114c. The bicycle mounting part 114a is non-movable mounted on the handlebar H. The support member 114b rotatably supports the rotary operating member 120. The rotary operating member 120 includes an annular gripping portion 124 that is rotatably disposed about the longitudinal axis A. The rotary operating member 120 further includes a flexible grip cover 126 and an inner part 128, as will be further discussed below. The flexible grip cover 126 is disposed over the annular gripping portion 124, while the inner part 128 is disposed inside the annular gripping portion 124. The annular gripping portion 124, the flexible grip cover 126 and the inner part 128 are rotatable together as a unit with respect to the base member 114. The rotary operating member 120 further includes a first biasing spring S1 and a second biasing spring S2 that extend in opposite directions around the inner part 128. The first biasing spring S1 is fixed to the inner part 128 at a first end, and is fixed to the support member 114b at a second end. Similarly, the second biasing spring S2 is fixed to the inner part 128 at a first end, and is fixed to the support member 114b at a second end. The first and second biasing springs S1 and S2 are preloaded under tension to bias the rotary operating member 120 towards the rest position. Therefore, the rotary operating member 120 is biased towards the rest position. In this way, the rotary operating member 120 returns to the rest position after the rotary operating member 120 is rotated in either the first direction D1 or the second direction D2 from the rest position.

In the second illustrated embodiment, the rotary operating member 120 outputs a first control signal to operate the height adjustable seatpost SP'. The additional operating member 122 outputs a second control signal to operate the gear transmission (i.e., the rear derailleur RD or the front derailleur FD). Therefore, the switch unit 116 is configured to output one of the first control signal and the second control signal in response to a rotation of the rotary operating member 120 in at least one of the first direction D1 and the second direction D2. The first control signal is configured to operate the height adjustable seatpost SP'. The first control signal includes a first telescopic control signal and a second telescopic control signal to operate the height adjustable seatpost SP'.

In the second illustrated embodiment, the rotary operating member 120 rotates in the first direction D1 to actuate an electric actuator 130 of a height of the height adjustable seatpost SP'. The rotary operating member 120 rotates in the second direction D2 to actuate the electric actuator 130 of the height of the height adjustable seatpost SP' by a different amount. Therefore, the rotary operating member 120 outputs the first telescopic control signal when rotated in the first direction D1. The rotary operating member 120 outputs the second telescopic control signal when rotated in the second direction D2. In other words, each of the first telescopic control signal and the second telescopic control signal is to control the height adjustable seatpost SP'. Thus, the switch unit 116 outputs the first telescopic control signal upon the rotary operating member 120 being operated in the first direction D1. The switch unit 116 outputs the second telescopic control signal upon the rotary operating member 120 being operated in the second direction D2. As the height adjustable seatpost SP' is a hydraulic unit, the height is decreased when the user places his weight on the bicycle seat BS.

Figure 15:
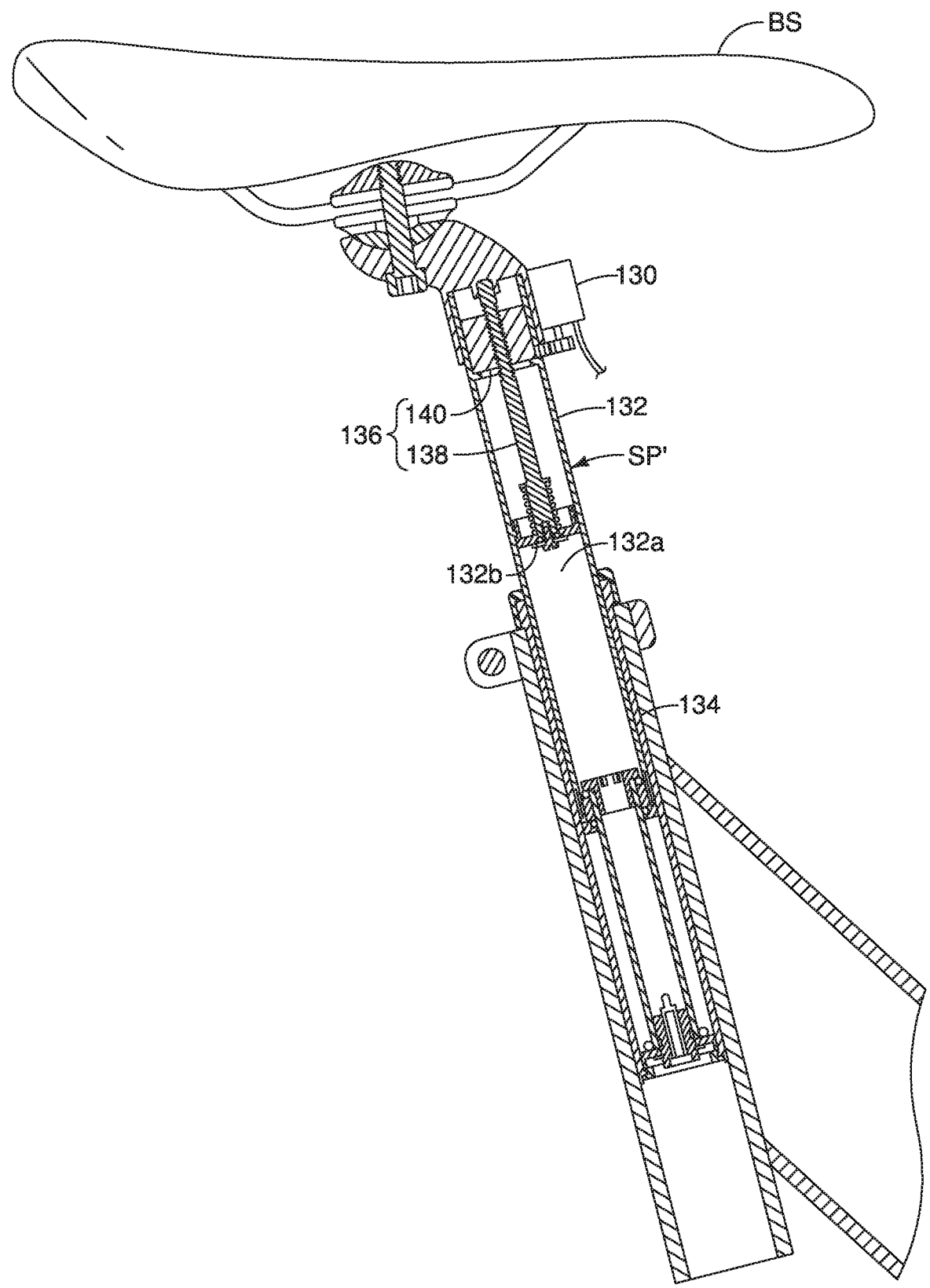
FIG. 15 is an enlarged longitudinal cross-sectional view of a portion of the bicycle illustrated in FIG. 1 that has been modified to be equipped with a hydraulic height adjustable seatpost.
Figure 16:
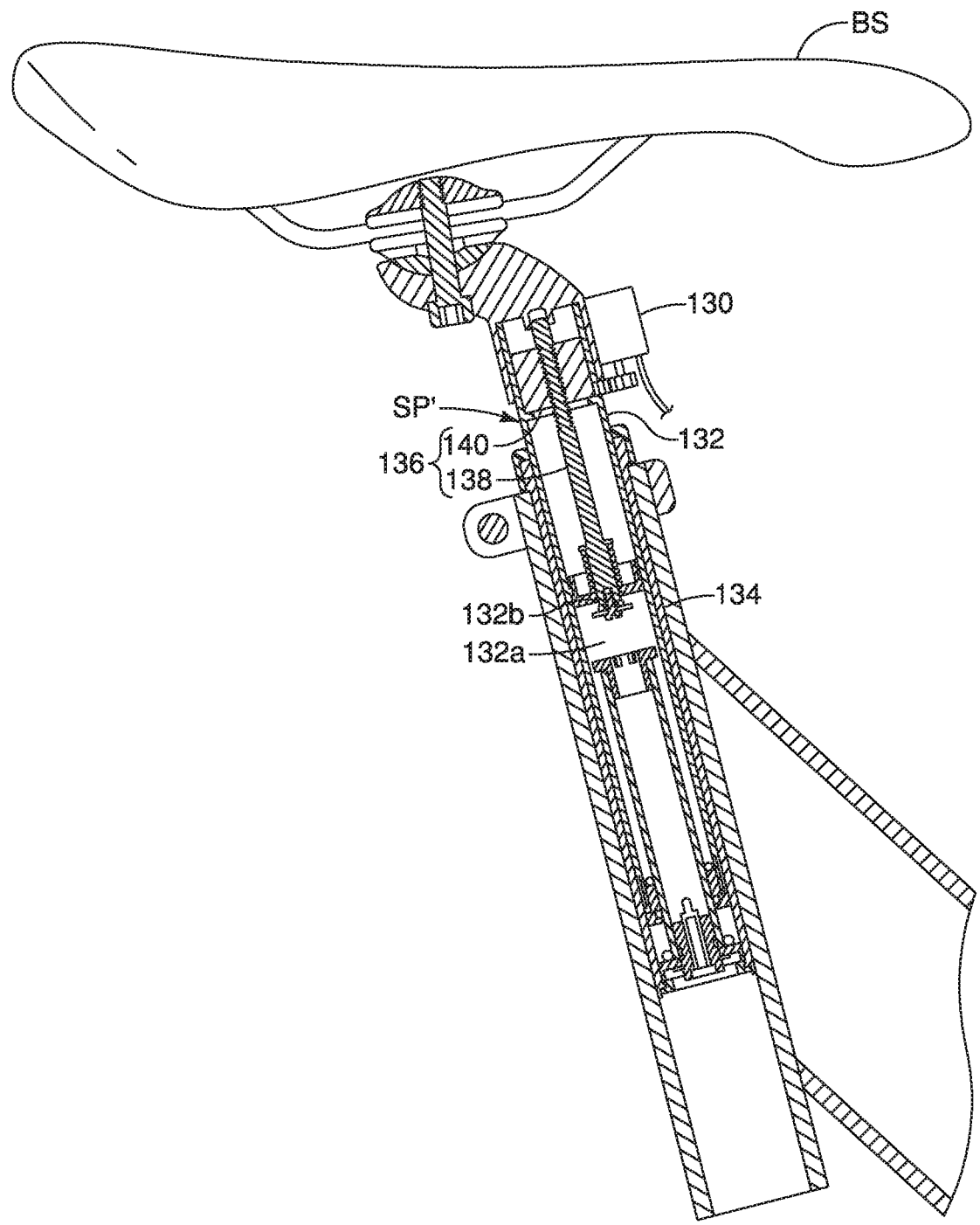
FIG. 16 is an enlarged longitudinal cross-sectional view of the height adjustable seatpost illustrated in FIG. 15 in a lowered position.

Turning now to FIGS. 15 and 16, the height adjustable seat post SP' will now be discussed. As previously stated, the height adjustable seatpost SP can be replaced with the height adjustable seatpost SP' for adjusting a seat height of the bicycle seat BS with respect to the bicycle frame F. The height adjustable seatpost SP' is controlled by the electronic controller of the electric twist-grip operating device 110A.

The height adjustable seatpost SP' uses internal pressures of gases and/or fluids to control the height of the height adjustable seatpost SP'. Here, the rider pushes down on the bicycle seat BS to lower the height of the height adjustable seatpost SP'. On the other hand, the rider removes his or her weight from the bicycle seat BS to raise the height of the height adjustable seatpost SP'. The height adjustable seatpost SP' basically includes an electric actuator 130, an inner tube 132, an outer tube 134 and a height adjustment device 136.

In general, the inner and outer tubes 132 and 134 are telescopically arranged, with the amount of insertion of the inner tube 132 into the outer tube 134 being adjustable. The height adjustment device 136 basically unlocks to the inner and outer tubes 132 and 134 so that the inner tube 132 can be selectively extended (raised) and retracted (lowered) with respect to the outer tube 134 by the user, based on a motor control signal from an operating switch of the electric twist grip operating device 110A via the electronic controller.

Similar to the electric actuator 30, the electric actuator 130 of the height adjustable seatpost SW basically includes a motor, a gear reduction unit and a position sensor. In particular, the height adjustment device 136 uses internal pressures of gases and/or fluids within the inner and outer tubes 132 and 134 to control the height or position of the inner and outer tubes 132 and 134 relative to one another. In this manner, the height of the bicycle seat BS can be controlled. More specifically, the inner and outer tubes 132 and 134 are filled with gases and/or fluids. The inner tube 132 has a fluid passage 132a divided into an upper section and a lower section with a hydraulic port 132b interconnecting the upper and lower sections of the fluid passage 132a.

The electronic controller of the electric twist-grip operating device 110A is configured to actuate the electric actuator 130 to open the hydraulic port 132b of the fluid passage 132a. With the hydraulic port 132b open, now, the user can change the height of the height adjustable seatpost SW to increase the height by removing his or her weight from the bicycle seat BS, or decrease the height by pushing down on the bicycle seat BS.

In the illustrated embodiment, the first telescopic control signal is a first valve control signal to open the hydraulic port 132b of the fluid passage 132a for a predetermined time period. In particular, the first telescopic control signal is a first valve control signal to open the hydraulic port 132b of the fluid passage 132a for a first time period. The second telescopic control signal is a second valve control signal to open the hydraulic port 132b of the fluid passage 132a. The second telescopic control signal is a second valve control signal to open the hydraulic port 132b of the fluid passage 132a for a second time period. The second time period is different from the first time period.

For example, the first time period can be greater than the second time period. In this instance, the first telescopic control signal will be outputted to maintain the hydraulic port 132b open for a longer period of time. Therefore, operating the rotary operating member 120 in the first direction D1 to generate the first telescopic control signals causes the height adjustable seatpost SP' to reach a prescribed high height. Operating the rotary operating member 120 in the second direction D2 to generate the second telescopic control signals causes the height adjustable seatpost SP' to reach a different prescribed height that is lower than the prescribed high height. In the second illustrated embodiment, therefore, the first telescopic control signal is a first valve control signal to open the hydraulic port 132b in a first amount. Similarly, the second telescopic control signal is a second valve control signal to open the hydraulic port 132b of in a second amount that is different from the first amount.

In the second illustrated embodiments, the switch unit 116 can output the first and second valve control signals continuously to the height adjustable seatpost SP until the desired seat height is reached. Alternatively, the switch unit 116 can output the first and second valve signals at an intermittent rate, such that the switch unit 116 intermittently outputs the signals until a desired seat height is reached. Thus, the first and the second valve control signals are each at least one of a continuous output and an intermittent output during the rotary operating member 120 being moved in the first and second directions D1 and D2.

Figure 17:
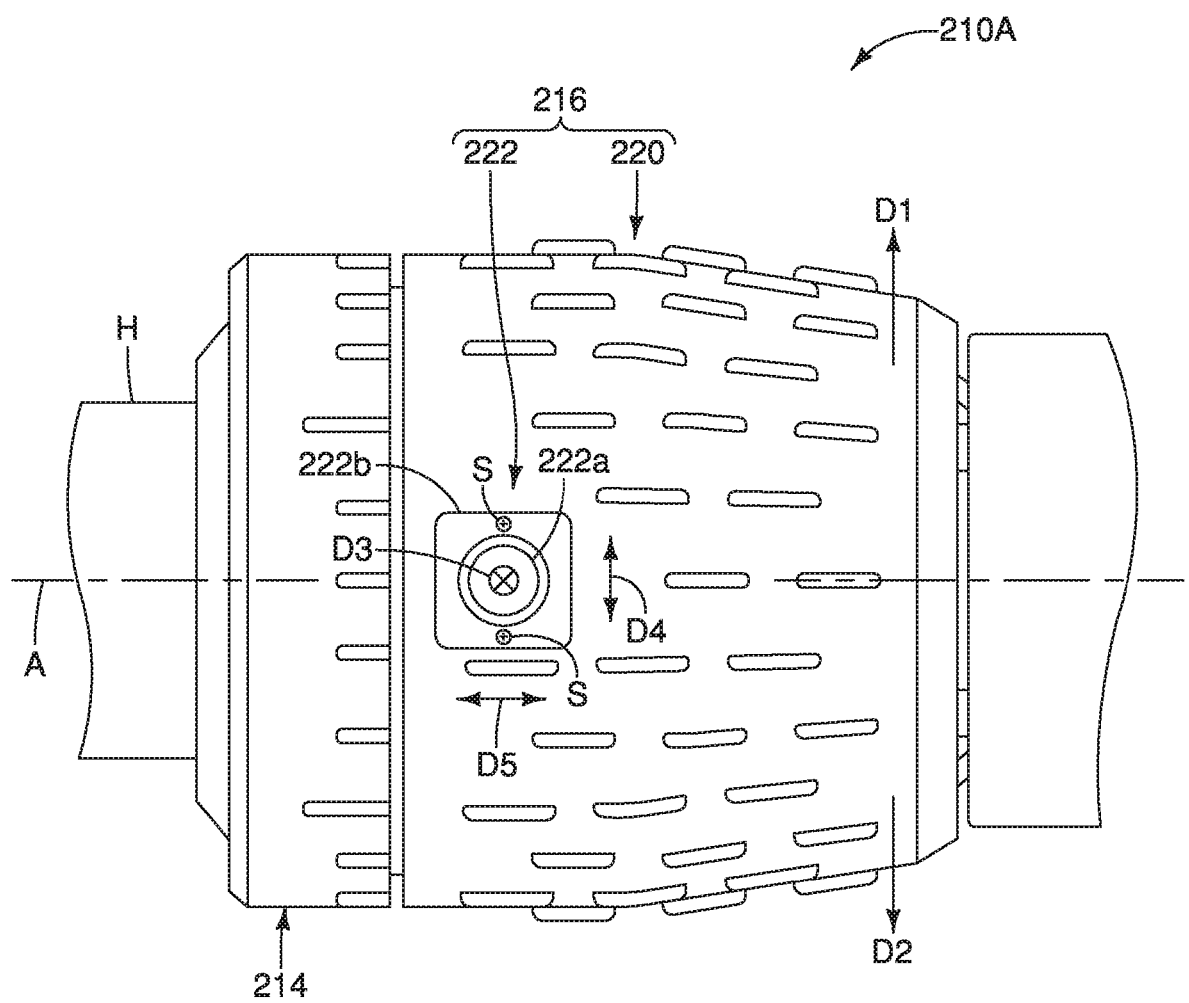
FIG. 17 is an enlarged top plan view of an electric twist-grip operating device in accordance with a third illustrated embodiment.

Turning now to FIG. 17, an electric twist-grip operating device 210A is illustrated in accordance with a third illustrated embodiment. The electric twist-grip operating device 210A is configured to be implemented with the bicycle 1 in place of the first electric twist-grip operating device 10A. The electric twist-grip operating device 210A is identical to the electric twist-grip operating device 110A of the second illustrated embodiment, except that the electric twist-grip operating device 210A includes a rotary operating member 220 has been modified to operate the electric height adjustable seatpost SP of the first illustrated embodiment. In particular, rotation of the rotary operating member 220 enables the rider to increase or a decrease the height of the height adjustable seatpost SP. The structure of the rotary operating member 220 is identical to that of the rotary operating member 120 of the second illustrated embodiment, and therefore, the structure of the rotary operating member 220 will not be further discussed herein. The structure and functions of the additional operating member 222 are identical to that of the additional operating member 122 of the second illustrated embodiment, and therefore, the function of the additional operating member 222 will not be further discussed herein. Thus, the electric twist-grip operating device 210A is configured to operate the height adjustable seatpost SP and the gear transmission.

The electric twist-grip operating device 210A includes a base member 214, a switch unit 216 and an electronic controller (not shown). The switch unit 216 has the rotary operating member 220 and the additional operating member 222. The rotary operating member 220 is rotatable with respect to the base member 214 about the longitudinal axis A of the handlebar H in at least one of the first direction D1 and a second direction D2. In particular, the rotary operating member 220 is rotatable in the first direction D1 and the second direction D2 that is opposite to the first direction D1. Therefore, the rotary operating member 220 is movable in both of the first direction D1 and the second direction D2 about a circumferential direction of the longitudinal axis A.

The switch unit 216 is configured to output one of the first control signal and the second control signal in response to a rotation of the rotary operating member 220 in at least one of the first direction D and the second direction D2. In particular, the switch unit 216 outputs the first control signal upon operation of the rotary operating member 220 to actuate the height adjustable seatpost SP. The switch unit 216 outputs the second control signal upon operation of the additional operating member 222 to operate the gear transmission. Thus, the second control signal is configured to operate the gear transmission.

In the third illustrated embodiment, the first control signal includes a first telescopic control signal and a second telescopic control signal. That is, when the rotary operating member 220 is rotated in the first direction D1, the rotary operating member 220 outputs the first telescopic control signal to increase the height of the height adjustable seatpost SP. In other words, the first telescopic control signal is a first actuation signal to extend a height of the height adjustable seatpost S. When the rotary operating member 220 is rotated in the second direction D2, the rotary operating member 220 outputs the second telescopic control signal to decrease the height of the height adjustable seatpost SP. The second telescopic control signal is a second actuation signal to retract the height of the height adjustable seatpost SP. Thus, the switch unit 216 outputs the first telescopic control signal upon the rotary operating member 220 being operated in the first direction D1 and outputs the second telescopic control signal upon the rotary operating member 220 being operated in the second direction D2. Each of the first telescopic control signal and the second telescopic control signal is to control the height adjustable seatpost SP.

Figure 18:
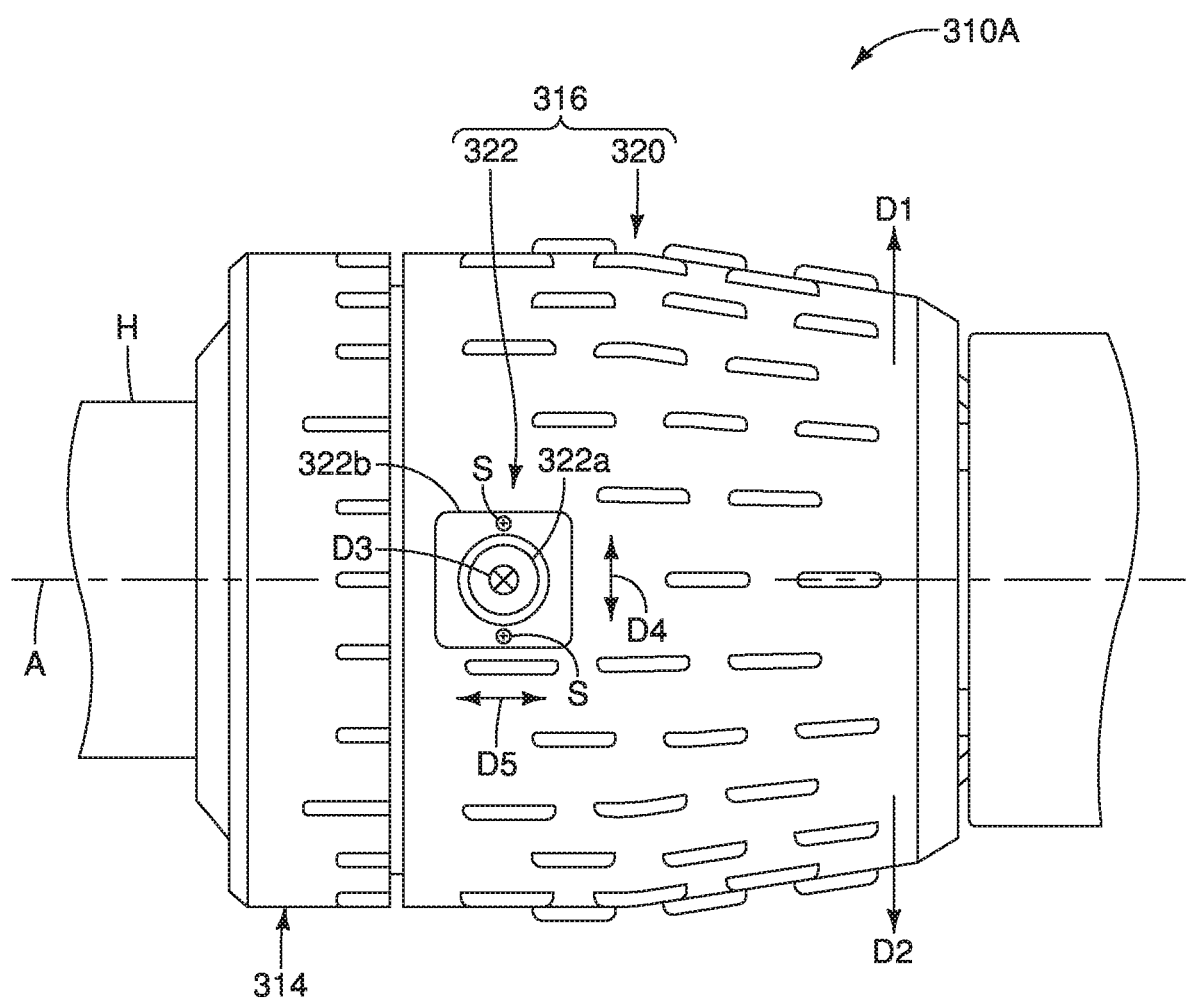
FIG. 18 is an enlarged top plan view of an electric twist-grip operating device in accordance with a fourth illustrated embodiment.

Turning now to FIG. 18, an electric twist-grip operating device 310A is illustrated in accordance with a fourth illustrated embodiment. The electric twist-grip operating device 310A is configured to be implemented with the bicycle 1 that has been modified to include the hydraulic height adjustable seatpost SP□. Thus, the electric twist-grip operating device 310A is configured to be implemented with the bicycle 1 in place of the first electric twist-grip operating device 10A. The electric twist-grip operating device 310A is identical to the electric twist-grip operating device 210A of the third illustrated embodiment, except the electric twist-grip operating device 310A has a rotary operating member 320 that has been modified to operate the height adjustable seatpost SP' and either front suspension FS or the rear suspension RS.

The structure of the rotary operating member 320 is identical to that of the rotary operating member 220 of the third illustrated embodiment and therefore will not be further discussed herein. The structure and function of the additional operating member 322 is identical to that of the additional operating member 222 of the third illustrated embodiment, and will therefore not be further discussed herein. Thus, the electric twist-grip operating device 310A is configured to operate the height adjustable seatpost SP', the front or rear suspension FS or RS and the gear transmission.

The electric twist-grip operating device 310A includes a switch unit 316 and a base member 314. The rotary operating member 320 is rotatable with respect to the base member 314 about the longitudinal axis A of the handlebar H in at least one of the first direction D1 and the second direction D2. In particular, the rotary operating member 320 is rotatable in the first direction D1 and the second direction D2 that is opposite to the first direction D1. Therefore, the rotary operating member 320 is movable in both of the first direction D1 and the second direction D2 about a circumferential direction of the longitudinal axis A.

The switch unit 316 is configured to output one of the first control signal and the second control signal in response to a rotation of the rotary operating member 320 in at least one of the first direction D and the second direction D2. In particular, when the rotary operating member 320 is rotated in the first direction D1, the height of the height adjustable seatpost SP□ is increased. When the rotary operating member 320 is rotated in the second direction D2, the front suspension FS or the rear suspension RS is operated between a plurality of damping characteristics. For example, the user can turn the rotary operating member 320 in the second direction D2 once so that the front suspension FS or the rear suspension RS is in a lock (little to no damping) condition.

The rotary operating member 320 can be rotated in the second direction D2 twice so that the front suspension FS or the rear suspension RS is in a middle (partial damping) condition. The rotary operating member 320 can be rotated in the second direction D2 again so that the front suspension FS or the rear suspension RS is in an open (full damping) condition. A lock state is a firm state as compared to an open state. In other words, the rotary operating member 320 can be rotated in the second direction D2 to choose between the plurality of damping conditions for the front suspension FS or the rear suspension RS.

The first control signal includes a first telescopic control signal and a second telescopic control signal. Therefore, the switch unit 316 outputs the first telescopic control signal upon the rotary operating member 320 being operated in the first direction D1. The switch unit 316 outputs the second telescopic control signal upon the rotary operating member 320 being operated in the second direction D2. The first telescopic control signal is to control the height adjustable seatpost SP'. The second telescopic control signal is to control the bicycle suspension (front suspension FS or rear suspension RS).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the s "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "top", "bottom", "side", "vertical", "horizontal". "perpendicular" and "transverse" as well as any other similar directional terms refer to those directions of a bicycle in an upright, riding position and equipped with the electric twist-grip operating device. Accordingly, these directional terms, as utilized to describe the electric twist-grip operating device should be interpreted relative to a bicycle in an upright riding position on a horizontal surface and that is equipped with the electric twist-grip operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric twist-grip operating device comprising:
    a base member configured to be mounted around a bicycle handlebar; and
    a switch unit configured to output a first control signal to control a bicycle apparatus including at least one of a height adjustable seatpost and a suspension, the switch unit including a rotary operating member rotatable circumferentially around a longitudinal axis of the bicycle handlebar, the switch unit being configured to output one of the first control signal and a second control signal in response to a movement of the rotary operating member, the second control signal being different from the first control signal and being configured to operate another bicycle apparatus that does not include at least one of the height adjustable seatpost and the suspension.

2. The electric twist-grip operating device according to claim 1, wherein
    the rotary operating member is rotatable with respect to the base member circumferentially around the longitudinal axis of the bicycle handlebar in at least one of a first direction and a second direction, the second direction being opposite to the first direction, and
    the switch unit is configured to output the one of the first control signal and the second control signal in response to a rotation of the rotary operating member in the at least one of the first direction and the second direction, the second control signal being configured to operate a gear transmission.

3. The electric twist-grip operating device according to claim 2, wherein
    the switch unit includes an additional operating member to output the other of the first control signal and the second control signal.

4. The electric twist-grip operating device according to claim 3, wherein
the additional operating member is movable with respect to the base member in a third direction that extends along a direction perpendicular to the longitudinal axis.

5. The electric twist-grip operating device according to claim 3, wherein
the additional operating member is movable with respect to the base member in a fourth direction that extends along one of the first direction and the second direction.

6. The electric twist-grip operating device according to claim 3, wherein
the additional operating member is movable with respect to the base member in a fifth direction that extends along the longitudinal axis.

7. The electric twist-grip operating device according to claim 3, wherein
the switch unit is configured to output the first control signal for a predetermined period per one operation applied to the additional operating member.

8. The electric twist-grip operating device according to claim 3, wherein
the switch unit is configured to continuously or intermittently output the first control signal per one operation applied to the additional operating member.

9. The electric twist-grip operating device according to claim 3, wherein
the additional operating member is rotatable with respect to the base member together with the rotary operating member upon rotation of the rotary operating member.

10. The electric twist-grip operating device according to claim 3, wherein
the additional operating member is stationary with respect to the base member circumferentially around the longitudinal axis of the bicycle handlebar.

11. The electric twist-grip operating device according to claim 3, wherein
the additional operating member is at least partly closer to a bicycle center plane than the rotary operating member in a mounted state where the electric twist-grip operating device is mounted on the bicycle handlebar.

12. The electric twist-grip operating device according to claim 3, wherein
the additional operating member is detachably attached to one of the base member and the rotary operating member.

13. The electric twist-grip operating device according to claim 2, wherein
the rotary operating member is movable in both of the first direction and the second direction circumferentially around the longitudinal axis, and the switch unit outputs an upshifting signal upon the rotary operating member being operated in the first direction and outputs a downshifting signal upon the rotary operating member being operated in the second direction.

14. The electric twist-grip operating device according to claim 2, wherein
the rotary operating member is selectively movable in the first direction in a first amount and a second amount that is larger than the first amount such that the second control signal is outputted differently upon the rotary operating member being moved the second amount as compared to the rotary operating member being moved the first amount.

15. The electric twist-grip operating device according to claim 2, wherein
the first control signal includes a first telescopic control signal and a second telescopic control signal,
the rotary operating member is movable in both of the first direction and the second direction circumferentially around the longitudinal axis, and
the switch unit outputs the first telescopic control signal upon the rotary operating member being operated in the first direction and outputs the second telescopic control signal upon the rotary operating member being operated in the second direction.

16. The electric twist-grip operating device according to claim 15, wherein
each of the first telescopic control signal and the second telescopic control signal is to control the height adjustable seatpost.

17. The electric twist-grip operating device according to claim 16, wherein
the first telescopic control signal is a first valve control signal to open a hydraulic port of a fluid passage for a predetermined time period, and the second telescopic control signal is a second valve control signal to open the hydraulic port of the fluid passage, the second valve control signal being at least one of a continuous output and an intermittent output during the rotary operating member being moved in the second direction.

18. The electric twist-grip operating device according to claim 16, wherein
the first telescopic control signal is a first valve control signal to open a hydraulic port of a fluid passage for a first time period, and the second telescopic control signal is a second valve control signal to open the hydraulic port of the fluid passage for a second time period that is different from the first time period.

19. The electric twist-grip operating device according to claim 16, wherein
the first telescopic control signal is a first valve control signal to open a hydraulic port in a first amount, and the second telescopic control signal is a second valve control signal to open the hydraulic port in a second amount that is different from the first amount.

20. The electric twist-grip operating device according to claim 16, wherein
the first telescopic control signal is a first actuation signal to extend a height of the height adjustable seatpost and the second telescopic control signal is a second actuation signal to retract the height of the height adjustable seatpost.

21. The electric twist-grip operating device according to claim 15, wherein
the first telescopic control signal is to control the height adjustable seatpost and the second telescopic control signal is to control the suspension.

22. The electric twist-grip operating device according to claim 1, wherein
the rotary operating member is movable between a rest position and an operated position, and biased toward the rest position.

23. The electric twist-grip operating device according to claim 1, wherein
the rotary operating member is configured to be maintained at an operated position.

24. The electric twist-grip operating device according to claim 1, wherein
the rotary operating member includes an annular gripping portion rotatably disposed about the longitudinal axis.

25. The electric twist-grip operating device according to claim 24, wherein the annular gripping portion has an axial length of at least twenty millimeters.

26. An electric twist-grip operating device comprising:

a base member configured to be mounted around a bicycle handlebar; and a switch unit configured to output a first control signal to control a bicycle apparatus including at least one of a height adjustable seatpost and a suspension, the switch unit including a rotary operating member rotatable with respect to the base member about a longitudinal axis of the bicycle handlebar, the switch unit being configured to output one of the first control signal and a second control signal in response to a movement of the rotary operating member, the second control signal being different from the first control signal, the switch unit further includes an additional operating member to output the other of the first control signal and the second control signal, the switch unit being configured to concurrently output the first control signal and the second control signal upon operations of both of the rotary operating member and the additional operating member.

* * * * *